US011329947B2

(12) United States Patent
Matsumoto

(10) Patent No.: US 11,329,947 B2
(45) Date of Patent: May 10, 2022

(54) COMMUNICATION DEVICE, CONTROL METHOD FOR COMMUNICATION DEVICE, AND STORAGE MEDIUM, FOR SETTING A DISTRIBUTION CRITERION

(71) Applicant: CANON KABUSHIKI KAISHA, Tokyo (JP)

(72) Inventor: Akinobu Matsumoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 85 days.

(21) Appl. No.: 16/038,743

(22) Filed: Jul. 18, 2018

(65) Prior Publication Data

US 2019/0044911 A1 Feb. 7, 2019

(30) Foreign Application Priority Data

Aug. 7, 2017 (JP) .............................. JP2017-152759

(51) Int. Cl.
| | | |
|---|---|---|
| *H04L 29/12* | (2006.01) | |
| *H04W 60/00* | (2009.01) | |
| *H04W 80/04* | (2009.01) | |
| *H04W 8/26* | (2009.01) | |
| *H04L 61/5007* | (2022.01) | |
| *H04L 101/659* | (2022.01) | |
| *H04L 61/5038* | (2022.01) | |
| *H04L 61/5092* | (2022.01) | |

(52) U.S. Cl.
CPC ...... *H04L 61/2007* (2013.01); *H04L 61/2038* (2013.01); *H04L 61/2092* (2013.01); *H04L 61/6059* (2013.01); *H04W 8/26* (2013.01); *H04W 60/00* (2013.01); *H04W 80/04* (2013.01)

(58) Field of Classification Search
CPC . H04L 61/2007; H04L 12/56; H04L 12/1872; H04L 67/147; H04L 61/2038; H04L 61/2092; H04L 61/6059; H04L 12/46; H04L 12/2836; H04L 29/12; H04W 4/70; H04W 4/80; H04W 8/26; H04W 60/00; H04W 80/04; G06F 13/42; Y02D 30/70
USPC ................................................. 709/206, 220
See application file for complete search history.

(56) References Cited

U.S. PATENT DOCUMENTS

| | | | |
|---|---|---|---|
| 9,407,504 B1 * | 8/2016 | Di Benedetto | ......... H04L 12/46 |
| 10,004,097 B1 * | 6/2018 | Somasandharam | ..... H04W 4/70 |
| 2003/0236897 A1 | 12/2003 | Shitano | |
| 2005/0030891 A1 * | 2/2005 | Stephens | ............... H04L 1/0003 370/229 |

(Continued)

OTHER PUBLICATIONS

Bouaziz M, Rachedi A. A survey on mobility management protocols in Wireless Sensor Networks based on 6LoWPAN technology. Computer Communications. Jan. 15, 2016;74:3-15. (Year: 2016).*

(Continued)

*Primary Examiner* — James N Fiorillo
(74) *Attorney, Agent, or Firm* — Canon U.S.A., Inc. IP Division

(57) ABSTRACT

In Internet Protocol version 6 (IPv6) over Low power Wireless Personal Area Networks (6LoWPAN), a distribution criterion for a prefix using a 6LoWPAN Context Option (6CO) can be set. The distribution criterion for the prefix using 6CO is set, and one of the prefix using the 6CO and a prefix using a Prefix Information Option (PIO) is distributed to another communication device based on the set distribution criterion.

11 Claims, 17 Drawing Sheets

(56) References Cited

U.S. PATENT DOCUMENTS

| | | | | |
|---|---|---|---|---|
| 2009/0073983 A1* | 3/2009 | Kim | H04W 80/06 | 370/392 |
| 2009/0185549 A1* | 7/2009 | Shon | H04L 69/22 | 370/349 |
| 2009/0304026 A1* | 12/2009 | Hamada | H04L 29/12358 | 370/466 |
| 2009/0316628 A1* | 12/2009 | Enns | H04W 92/02 | 370/328 |
| 2010/0067540 A1* | 3/2010 | Park | H04L 49/3072 | 370/419 |
| 2011/0149964 A1* | 6/2011 | Judge | H04L 45/58 | 370/392 |
| 2011/0170531 A1* | 7/2011 | Ng | H04W 8/26 | 370/338 |
| 2013/0070745 A1* | 3/2013 | Nixon | H04L 45/74 | 370/338 |
| 2013/0215810 A1* | 8/2013 | Wang | H04W 4/80 | 370/311 |
| 2014/0064259 A1* | 3/2014 | Lee | H04L 45/74 | 370/338 |
| 2014/0379817 A1* | 12/2014 | Logue | G06Q 10/107 | 709/206 |
| 2015/0207772 A1* | 7/2015 | Walker | H04L 69/18 | 370/392 |
| 2015/0244840 A1* | 8/2015 | Chakrabarti | H04L 69/08 | 370/328 |
| 2016/0007398 A1* | 1/2016 | Choi | H04W 4/80 | 370/310 |
| 2016/0088517 A1* | 3/2016 | Akyurek | H04L 61/6081 | 370/328 |
| 2016/0112315 A1* | 4/2016 | Tosaka | H04L 45/54 | 370/392 |
| 2016/0142308 A1* | 5/2016 | Gage | H04L 45/74 | 370/392 |
| 2016/0182432 A1* | 6/2016 | De | H04L 12/2803 | 709/204 |
| 2016/0337786 A1* | 11/2016 | Kafle | H04L 63/10 | |
| 2017/0093704 A1* | 3/2017 | Cui | H04L 61/6077 | |
| 2017/0127370 A1* | 5/2017 | Wang | H04W 48/10 | |
| 2017/0149614 A1* | 5/2017 | Zheng | H04L 63/101 | |
| 2018/0191669 A1* | 7/2018 | Barton | H04L 45/02 | |
| 2019/0014615 A1* | 1/2019 | Wang | H04L 61/6059 | |
| 2019/0166088 A1* | 5/2019 | Krochik | H04L 67/2804 | |
| 2019/0281495 A1* | 9/2019 | Wu | H04L 45/741 | |
| 2020/0084277 A1* | 3/2020 | Somaraju | H04L 67/12 | |

OTHER PUBLICATIONS

Spoerk, M. "6Lo Working Group C. Gomez Internet-Draft S. Darroudi Intended status: Standards Track Universitat Politecnica de Catalunya Expires: Mar. 31, 2020 T. Savolainen DarkMatter." (2019). (Year: 2019).*

Bouaziz M, Rachedi A. A survey on mobility management protocols in Wireless Sensor Networks based on 6LoWPAN technology. Computer Communications. Jan. 15, 2016;74:3-15. (Year: 2016) (Year: 2016).*

* cited by examiner

FIG.5

| PREFIX | TYPE OF DETECTION RESULT | DISTRIBUTION METHOD | |
|---|---|---|---|
| fd00:1111::/64 | TEMPERATURE (0x01) | 6CO (CID = 1) | ~502 |
| fd00:2222::/64 | HUMAN DETECTION (0x02) | 6CO (CID = 2) | ~503 |
| fd00:aaaa::/64 | ILLUMINANCE (0x0a) | PIO | ~504 |
| fd00:eeee::/64 | VIBRATION (0x0e) | NO DISTRIBUTION | ~505 |

| TYPE OF DETECTION RESULT | PREFIX | |
|---|---|---|
| TEMPERATURE (0x01) | fd00:1111::/64 | ~802 |
| ILLUMINANCE (0x0a) | fd00:aaaa::/64 | ~803 |

| RULE | ACTION |
|---|---|
| TRANSMISSION SOURCE ID = :ff:fe00:01XX | DESTINATION = SENSOR DATA PROCESSING DEVICE 106 OUTPUT PORT = WIRELESS LAN |
| TRANSMISSION SOURCE ID = :ff:fe00:0aXX | DESTINATION = SENSOR DATA PROCESSING DEVICE 107 OUTPUT PORT = WIRELESS LAN |
| ... | ... |
| TRANSMISSION SOURCE Prefix = fd00:1111::/64 | DESTINATION = SENSOR DATA PROCESSING DEVICE 106 OUTPUT PORT = WIRELESS LAN |
| TRANSMISSION SOURCE Prefix = fd00:aaaa::/64 | DESTINATION = SENSOR DATA PROCESSING DEVICE 107 OUTPUT PORT = WIRELESS LAN |

FIG.13

| PREFIX | TYPE OF DETECTION RESULT | NUMBER OF NODES | NUMBER OF PACKET TRANSFERS | NUMBER OF FRAGMENTS | DISTRIBUTION METHOD |
|---|---|---|---|---|---|
| fd00:1111::/64 | TEMPERATURE (0x01) | 20 | 10,000 | 10 | 6CO (CID = 1) |
| fd00:2222::/64 | HUMAN DETECTION (0x02) | 15 | 8,000 | 0 | 6CO (CID = 2) |
| fd00:aaaa::/64 | ILLUMINANCE (0x0a) | 10 | 5,000 | 500 | NO DISTRIBUTION |
| fd00:eeee::/64 | VIBRATION (0x0e) | 0 | 0 | 0 | PIO |
| fd00:1234:5678::/64 | DEFAULT | 0 | 0 | 0 | 6CO (CID = 0) |

FIG.15

| RULE | ACTION | PRIORITY |
|---|---|---|
| TRANSMISSION SOURCE ID = :ff:fe00:01XX | DESTINATION = SENSOR DATA PROCESSING DEVICE 106 OUTPUT PORT = WIRELESS LAN | HIGH |
| TRANSMISSION SOURCE ID = :ff:fe00:0aXX | DESTINATION = SENSOR DATA PROCESSING DEVICE 107 OUTPUT PORT = WIRELESS LAN | HIGH |
| ... | ... | |
| TRANSMISSION SOURCE Prefix = fd00:1111::/64 | DESTINATION = SENSOR DATA PROCESSING DEVICE 106 OUTPUT PORT = WIRELESS LAN | HIGH |
| ... | ... | |
| TRANSMISSION SOURCE Prefix = fd00:1234:5678::/64 | DESTINATION = INFORMATION PROCESSING DEVICE 101 OUTPUT PORT = LOCAL | LOW |

FIG.17

| RULE | ACTION |
|---|---|
| TRANSMISSION SOURCE ID<br>= :ff:fe00:01XX | DESTINATION = SENSOR DATA<br>PROCESSING DEVICE 106<br>OUTPUT PORT = WIRELESS LAN |
| TRANSMISSION SOURCE ID<br>= :ff:fe00:0aXX | DESTINATION = SENSOR DATA<br>PROCESSING DEVICE 107<br>OUTPUT PORT = WIRELESS LAN |
| VENDOR ID = 00:00:85<br>TRANSMISSION SOURCE Prefix<br>= fd00:1111::/64 | DESTINATION = SENSOR DATA<br>PROCESSING DEVICE 106<br>OUTPUT PORT = WIRELESS LAN |
| VENDOR ID = 00:00:85<br>TRANSMISSION SOURCE Prefix<br>= fd00:aaaa::/64 | DESTINATION = SENSOR DATA<br>PROCESSING DEVICE 107<br>OUTPUT PORT = WIRELESS LAN |

COMMUNICATION DEVICE, CONTROL METHOD FOR COMMUNICATION DEVICE, AND STORAGE MEDIUM, FOR SETTING A DISTRIBUTION CRITERION

BACKGROUND

Field of the Invention

The present invention relates to a communication device that distributes a prefix.

Description of the Related Art

Communication using an Internet Protocol (IP) address is generally performed. In recent years, 6LoWPAN has been used in many occasions as an upper-layer protocol for a wireless personal area network (WPAN). 6LoWPAN is an abbreviation for Internet Protocol version 6 (IPv6) over Low power Wireless Personal Area Networks.

In the 6LoWPAN, communication using an IP address that conforms to Internet Protocol version 6 (IPv6) is performed. Each device in the 6LoWPAN receives a prefix from a router, generates an IP address to be used by the device based on the received prefix, and uses the generated IP address.

As a method for a router to distribute a prefix, 6LowPAN specifies that a Prefix Information Option (PIO) and a 6LowPAN Context Option (6CO) can be used.

When each device in the 6LoWPAN generates an IP address based on a prefix distributed by the 6CO, the IP address and be compressed and used.

As described above, as a method for distributing a prefix for setting an IPv6 address, 6CO and PIO are defined in the 6LoWPAN. The use of 6CO enables compression of an IP address, which enhances the communication efficiency of a network. However, the number of prefixes that can be distributed by the 6CO is limited. Accordingly, it is impossible to distribute all prefixes by the 6CO, and thus there is a need to distribute prefixes by the PIO.

SUMMARY

In view of the above, the following embodiments are directed to providing a technique that allows setting a criterion for distributing a prefix used for setting an IPv6 address.

In view of the above, according to an aspect of some embodiments, a communication device includes a storage unit configured to store a prefix using an Internet Protocol version 6 (IPv6) over Low power Wireless Personal Area Networks (6LoWPAN) Context Option (6CO) in an Internet Protocol (IP) address conforming to Internet Protocol version 6 (IPv6), a setting unit configured to set a distribution criterion for the prefix using the 6CO, the prefix being stored in the storage unit, and a distribution unit configured to distribute, to another communication device, one of the prefix using the 6CO and a prefix using a Prefix Information Option (PIO) based on the distribution criterion set by the setting unit.

Further features of the following embodiments will become apparent from the following description of exemplary embodiments with reference to the attached drawings.

BRIEF DESCRIPTION OF THE DRAWINGS

FIG. 5 illustrates a prefix list of the relay device according to the first exemplary embodiment.

FIG. 8 illustrates a prefix table of the sensor according to the first exemplary embodiment.

FIG. 10 illustrates a flow table of the relay device according to the first exemplary embodiment.

FIG. 13 illustrates a prefix list of the relay device according to the second exemplary embodiment.

FIG. 15 illustrates a flow table of the relay device according to the second exemplary embodiment.

FIG. 17 illustrates a flow table of a relay device according to a third exemplary embodiment.

DESCRIPTION OF THE EMBODIMENTS

Exemplary embodiments will be described below with reference to the drawings.

All of features described in the following exemplary embodiments are not necessarily essential for all embodiments.

<System Configuration>

Figure 1:
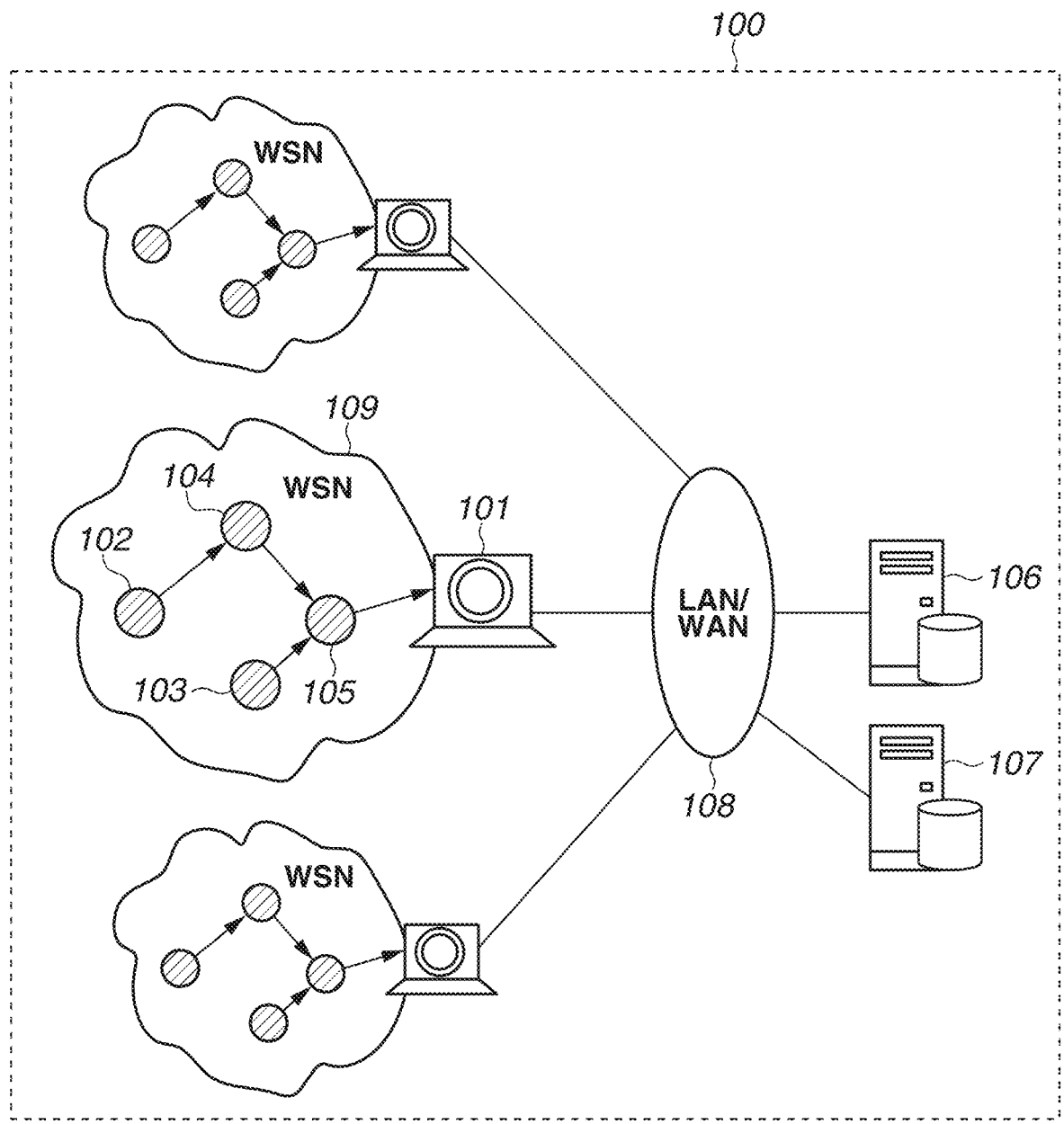
FIG. 1 is a system configuration diagram illustrating an information processing system according to an exemplary embodiment.

FIG. 1 illustrates a configuration of an information processing system 100 according to a first exemplary embodiment. The information processing system 100 includes a relay device 101; sensors 102, 103, 104, and 105; sensor data processing devices 106 and 107; a local area network (LAN)/wide area network (WAN) 108; and a wireless sensor network (WSN) 109 including the sensors. As described above, each sensor is included in the concept of "communication device". Each "sensor" is described below as an example of the communication device connected to the WSN 109. While some embodiments are applicable to data other than sensor data, "sensor data" is used in the following exemplary embodiments. While some embodiments are also applicable to networks other than the sensor network, the "sensor network" is used in the following exemplary embodiments. Devices for processing data transmitted from the relay device 101 are not limited to the sensor data processing devices. However, for ease of understanding, the devices are herein referred to as "sensor data processing devices". In the present exemplary embodiment, the sensors 102, 103, 104, and 105 may be collectively referred to as "the sensors 102 to 105." When one of the sensors 102 to 105 is indicated, the sensor is referred to as a sensor 102, or is simply referred to as a sensor.

The relay device 101 is connected to the LAN/WAN 108, which is a network including a LAN and a WAN. The relay device 101 and the LAN/WAN 108 may be connected via a wired connection, such as Ethernet®, or via a wireless connection, such as a wireless LAN (WLAN) or a mobile communication line. Examples of the WLAN include Wi-Fi (conforming to Institute of Electrical and Electronic Engineers (IEEE) 802.11 series standard) and Bluetooth®. While the present exemplary embodiment illustrates a case where the relay device 101 is connected to the sensor data processing devices 106 and 107 via the LAN/WAN 108, the relay device 101 may be connected by one of the WAN or LAN. Alternatively, the relay device 101 may be directly connected to the sensor data processing devices 106 and 107 by using a universal serial bus (USB) or the like, without passing through the WAN or the LAN. The following description is made assuming that a plurality of relay devices 101 is connected to the sensor data processing devices 106 and 107 via the LAN/WAN 108 and focusing on one of the plurality of relay devices 101.

The relay device 101 and the sensors 102 to 105 construct the WSN 109, which is a mesh network, by wireless personal area network (PAN) communication. The WSN 109 is not limited to a mesh network topology, but instead may be a star network. Devices to be connected to the WSN 109 are not limited to the relay device 101 and the sensors 102 to 105, but may include a router and other devices capable of transferring packets to other nodes.

Examples of wireless PAN communication standards include Bluetooth®, Zigbee®, and Wi-SUN®. In the WSN 109, communication is performed using a protocol of any one of the wireless PAN standards. Further, assume that Internet Protocol version 6 (IPv6) over Low power Wireless Personal Area Networks (6LoWPAN) is used as an upper-layer protocol.

Each of the sensors 102 to 105 transmits packets of sensor data to the relay device 101 via the WSN 109. The relay device 101 functions as a gateway for the LAN/WAN 108 of the WSN 109. Specifically, the relay device 101 transfers packets transmitted from the inside of the WSN 109 to the LAN/WAN 108. The following description is made assuming that the information processing system 100 according to the present exemplary embodiment performs communication based on IPv6 in the LAN/WAN 108. Specifically, the relay device 101 receives, from the WSN 109, packets subjected to header compression and fragmentation by 6LoWPAN, decompresses and reassembles the packets to convert the packets into IPv6 packets, and transfers the IPv6 packets.

The relay device 101 operates as a border router (6LBR) in the 6LoWPAN. The 6LBR has authority to add a 6LoWPAN Context Option (6CO) and a Prefix Information Option (PIO) to a packet of a router advertisement (RA) and distribute a list of IPv6 address prefixes (hereinafter referred to simply as a "prefix") to a host in the WSN 109. The term "router advertisement (RA)" used herein refers to a transmission message to notify each sensor of prefix information and destination information about 6LoWPAN packets. The term "6CO" refers to an option including a Context ID (CID) as identification information determined in association with a predetermined prefix. The term "PIO" refers to an option for informing a prefix to be used for determining an identical link and generating an address. A method for distributing a prefix according to the present exemplary embodiment will be described below.

On the other hand, the sensors 102 to 105 each operate as a 6LoWPAN node (6LN) or a router (6LR). In either case where the sensors 102 to 105 each operate as the 6LN or 6LR, when the sensors 102 to 105 participate in the WSN 109, IPv6 address automatic setting processing is executed. In this case, the sensors 102 to 105 each acquire a list of prefixes of IPv6 addresses included in the 6CO and PIO to be added to the RA received from the 6LBR or 6LR. Further, an interface ID is added to each prefix included in the list to create an IPv6 address, and the created IPv6 address is set to a network interface. The interface ID (IID) is a 64-bit identifier that constitutes a 128-bit IPv6 address together with a 64-bit prefix and includes identification information for identifying a transmission source. Processing for adding the interface ID will be described in detail below.

IPv6 addresses set by the sensors 102 to 106, respectively, by using a prefix included in the prefix list distributed by the 6LBR are managed in an integrated fashion by the 6LBR using Address Registration Option (ARO), Duplicate Address Request (DAR), and Duplicate Address Configuration (DAC) packets included in the neighbor solicitation (NS) and neighbor advertisement (NA) packets so as to perform duplicate address detection processing. The term "neighbor solicitation NS" refers to a request for inquiring about an address of a link layer, checking the possibility of arrival of data, and detecting a duplicate address. The term "neighbor advertisement NA" refers to a response to the neighbor solicitation NS. The term "ARO" refers to an option for informing a 64-bit identifier used for the 6LBR to identify a 6LoWPAN node. The term "DAR" refers to an inquiry about whether nodes having the same IPv6 address are present in a 6LoWPAN network. The term "DAC" refers to a transmission message for returning a result of IPv6 address duplicate checking processing to a transmission source which has transmitted a duplicate address request. In the present exemplary embodiment, the relay device 101 may function not only as a gateway, but also as a network camera or a printer. The relay device 101 may also be a personal computer (PC), a smartphone, a router, or the like which is capable of executing an application for performing other processing.

The sensor data processing devices 106 and 107 each receive sensor data packets transmitted from the sensors 102 to 105 via the relay device 101, and analyze and accumulate sensor data. Further, the sensor data processing devices 106 and 107 may display the analysis result of the sensor data and notify the relay device 101 of the analysis result. The sensor data processing devices 106 and 107 may be, for example, PCs or smartphones, or may have a configuration in which a server function is constructed on a virtualization infrastructure generally called "cloud."

Each of the sensors 102 to 105 included in the WSN 109 is a device capable of measuring some values and detecting an event, such as a gyroscopic operation, acceleration, orientation, distance, vibration, temperature, illuminance, ultraviolet (UV) rays, atmospheric pressure, gas, radiation, odor, opening/closing of a door or window, or intrusion. The sensors 102 to 105 each transmit, to the relay device 101, the detection result including at least one of information indicating that a predetermined event has been detected, and a value obtained by measurement. In addition, for example, the sensors 102 to 105 may periodically transmit information indicating whether a predetermined environmental condition, such as a temperature equal to or higher than a threshold at an installation location, is satisfied. In the actual transmission processing, the sensors 102 to 105 each add a header of a sensor data packet including a destination address and the like to the detection result, and transmit the destination result as a packet that conforms to the 6LoW-PAN standards, which enable communication on the WSN 109.

Assume in the present exemplary embodiment that one or both of the sensor data processing devices 106 and 107 designate a transfer destination of a sensor data packet including a detection result to the relay device 101. For example, the sensor data processing devices 106 and 107 may designate a packet including a detection result of a specific type, such as detection of a temperature or intrusion, in the sensor data packets, which have reached the relay device 101, so that the packet is transferred to the sensor data processing device 106, and may designate packets for detection results of the other types so that the packets are transferred to the sensor data processing device 107. The relay device 101 determines the transfer destination of each received sensor data packet according to the designations, overwrites the destination of the packet with the sensor data processing device 106 or 107, and then transfers the packet to the destination.

In the present exemplary embodiment, an OpenFlow technique is applied to the designation of a transfer destination for the relay device 101 that is executed by the sensor data processing devices 106 and 107 described above, and overwriting of the destination of the sensor data packet that is executed by the relay device 101.

In the present exemplary embodiment, an OpenFlow controller function is mounted on each of the sensor data processing devices 106 and 107, and an OpenFlow switch function is mounted on the relay device 101. In this manner, the sensor data processing devices 106 and 107 define and make a setting about transfer of sensor data packets in the relay device 101 as flow information in the OpenFlow.

The flow information in the OpenFlow includes a matching rule as a condition for designating packets to be transferred, and an action list as a group of processes to be executed as packet transfer processing that matches the matching rule. In the present exemplary embodiment, the sensor data processing devices 106 and 107 each set a matching rule for flow information to the relay device 101. The matching rule for the flow information includes a condition for determining whether packets received by the relay device 101 are sensor data including a specific detection result. In the present exemplary embodiment, the matching rule includes a condition for determining whether the received packets are sensor data packets including a specific detection result, by using a transmission source address of the packets. Further, information indicating that the destination of each packet is overwritten with one of the sensor data processing devices 106 and 107 is included in the action list.

In addition, when the relay device 101 receives, from the WSN 109, packets including unknown sensor data incompatible with the flow information, the relay device 101 may send an inquiry about a packet transfer processing method to one or both of the sensor data processing devices 106 and 107 by using OpenFlow. Further, in order to reduce the number of changes in the transfer destination and the amount of transfer of sensor data packets to be transferred to the LAN/WAN 108, the sensor data processing devices 106 and 107 may update the flow information of the relay device 101.

The present exemplary embodiment assumes a case where transfer processing is controlled using OpenFlow, but instead may use a configuration in which an application that runs on the relay device 101 performs transfer processing by another method.

<Hardware Configuration of Relay Device 101>

Figure 2:
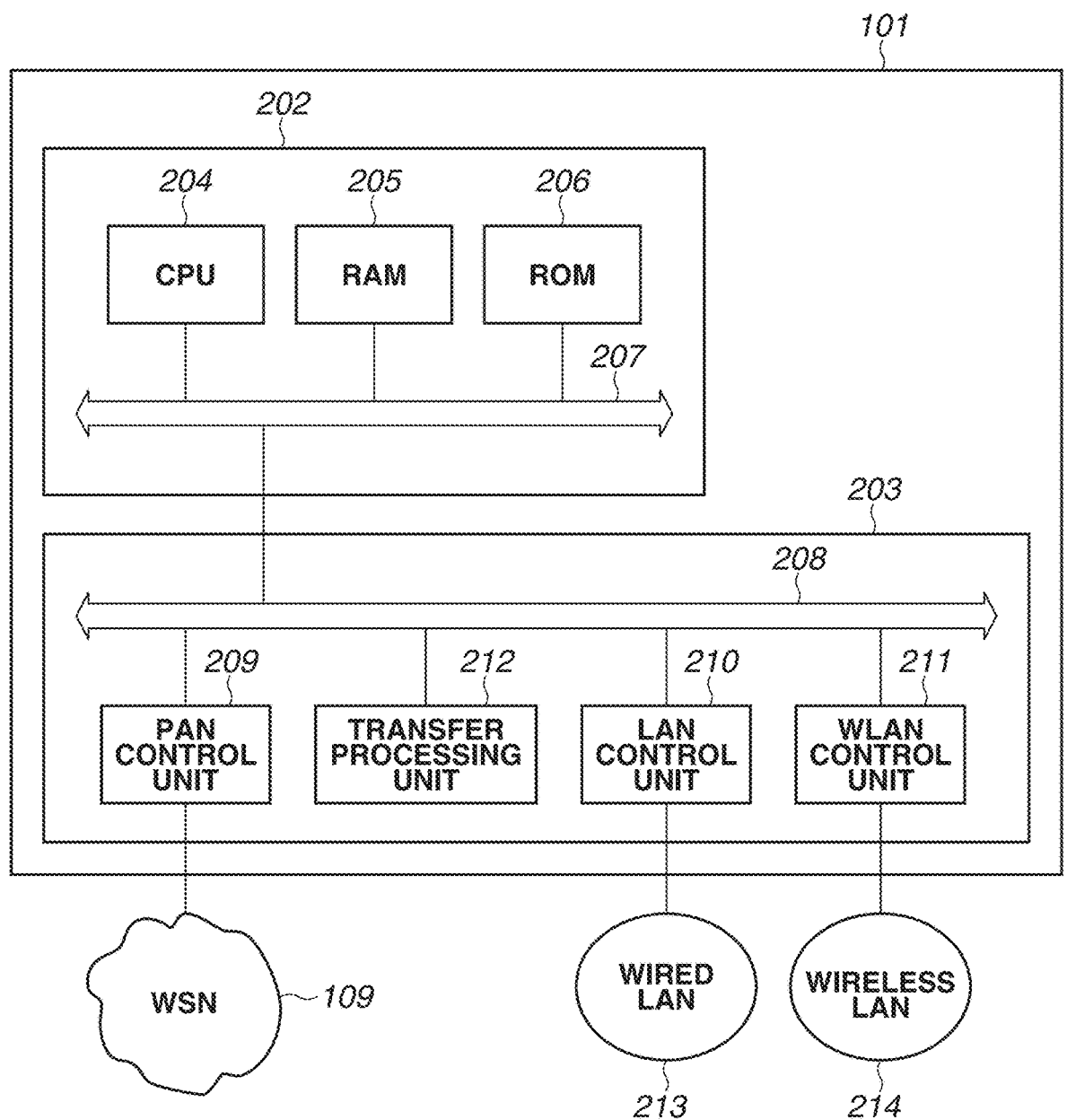
FIG. 2 is a hardware block diagram illustrating a relay device of the information processing system according to an exemplary embodiment.

Next, the hardware configuration of the relay device 101 according to the present exemplary embodiment will be described with reference to FIG. 2. The relay device 101 mainly includes, as a hardware configuration, a system unit 202 and a communication processing unit 203.

The system unit 202 includes a central processing unit (CPU) 204, a random access memory (RAM) 205, a read only memory (ROM) 206, and a system bus 207. The system bus 207 connects the CPU 204, the RAM 205, and the ROM 206 to each other to transmit information. The CPU 204 controls the entire relay device 101 by using computer programs and data stored in the RAM 205 or the ROM 206. Programs to be executed by the CPU 204 include an operating system (OS), an application, a Transmission Control Protocol (TCP)/Internet Protocol (IP) protocol stack, and a PAN stack. The RAM 205 is a main storage unit for the relay device 101 and is used as a temporary storage area for the CPU 204 to execute programs and input and output data to the communication processing unit 203. The ROM 206 is a non-volatile storage unit that stores software programs to be executed by the CPU 204. Programs stored in the ROM 206 are transferred to the RAM 205 and loaded and executed by the CPU 204.

The communication processing unit 203 includes a local bus 208, a PAN control unit 209, a LAN control unit 210, a WLAN control unit 211, and a transfer processing unit 212. The local bus 208 connects the PAN control unit 209, the LAN control unit 210, the WLAN control unit 211, and the transfer processing unit 212 to each other to transmit information.

The PAN control unit 209 is a communication interface that is connected to the WSN 109 and conforms to wireless PAN standards, and executes transmission and reception of transmission packets to and from the WSN 109. Further, the PAN control unit 209 executes control of a connection conforming to wireless communication standards, such as Zigbee® and Wi-SUN®, and also executes processing such as header compression/decompression by 6LoWPAN, and fragmentation/reassembly. In the present exemplary embodiment, the relay device 101 is connected to the WSN 109, which has a mesh network configuration. However, the relay device 101 may communicate with each sensor by peer-to-peer connection. Particularly, in this case, the PAN control unit 209 may support standards such as Bluetooth®.

The LAN control unit 210 is a communication interface to be connected to a wired LAN 213 included in the LAN/WAN 108, and executes transmission and reception of transmission packets to and from the wired LAN 213. The LAN control unit 210 includes PHY and MAC (transmission media control) hardware circuits for transmission media. For example, when the wired LAN 213 to which the relay device 101 is connected is Ethernet®, the LAN control unit 210 corresponds to an Ethernet® network interface card (NIC).

The WLAN control unit 211 is a communication interface to be connected to a wireless LAN 214 included in the LAN/WAN 108, and executes transmission and reception of transmission packets to and from the wireless LAN 214. The WLAN control unit 211 includes a controller and a radio frequency (RF) circuit which execute control of a wireless LAN such as IEEE802.11a/b/g/n/ac.

The transfer processing unit 212 is a functional unit which has an OpenFlow switch function and performs packet transfer processing. Packets to be subjected to transfer processing include packets received by the PAN control unit 209 and packets to be transmitted by the TCP/IP protocol stack executed by the CPU 204. The transfer processing unit 212 analyzes an input packet, checks a transfer condition for the packet, and executes processing associated with the transfer of the packet. In this case, the transfer processing unit 212 sets header information (e.g., each field of an IPv6 header) of the packet to be transferred to the LAN/WAN 108. In a representative example, a destination field of IPv6 header information about the packet to be transferred is set.

<Hardware Configuration of Sensors 102 to 105>

Figure 3:
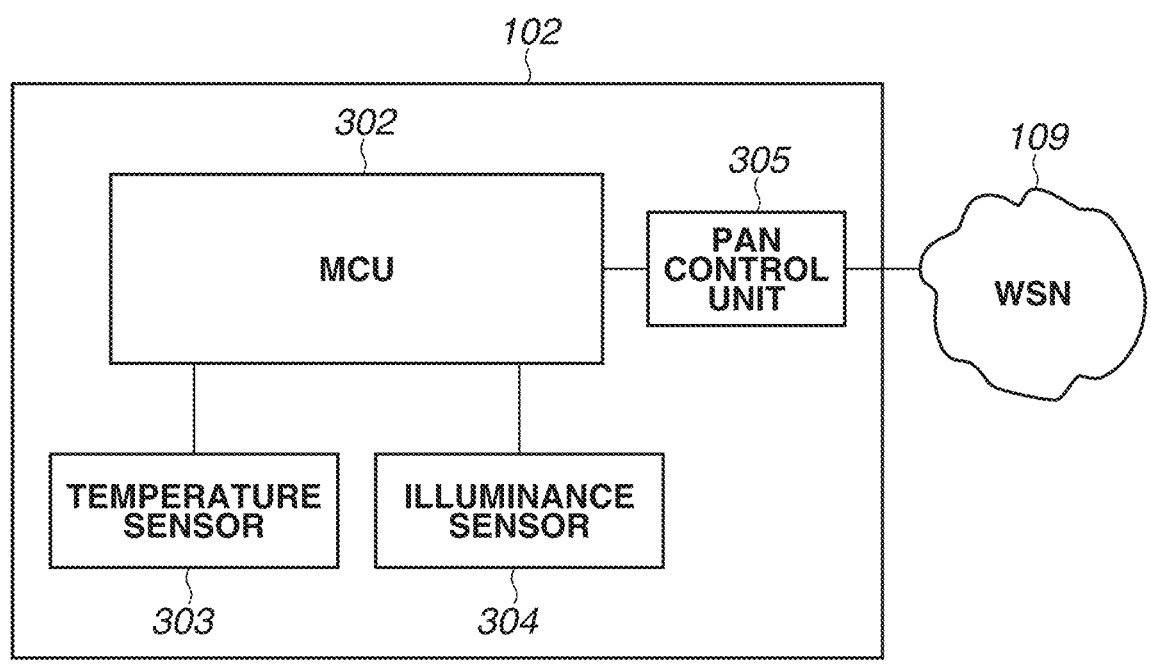
FIG. 3 is a hardware block diagram illustrating a sensor of the information processing system according to the exemplary embodiment.

Next, the hardware configuration of the sensors 102 to 105 according to the present exemplary embodiment will be described with reference to FIG. 3. The hardware configuration of the sensor 102 will now be described by way of example. However, assume that the other sensors have a configuration similar to the configuration of the sensor 102. Also, the sensors 102 to 105 may have different numbers and types of sensing modules mounted thereon depending on the number and type of a measured value or event to be detected.

The sensor 102 includes a micro-controller unit (MCU) 302, a temperature sensor 303, an illuminance sensor 304, and a PAN control unit 305. The MCU 302 uses computer programs and data stored in a small memory area held therein to perform processing, such as acquisition of a detection result using a sensing module, generation and transmission of sensor data packets, and setting processing required for transmission of packets. The setting processing required for transmission of packets includes IPv6 address automatic setting processing. This processing will be described in detail below.

The temperature sensor 303 and the illuminance sensor 304 are sensing modules for detecting a measured value or event. The PAN control unit 305 is a network interface that is connected to the WSN 109 and conforms to wireless PAN standards, and executes transmission and reception of transmission packets to and from the WSN 109. The PAN control unit 305 also executes processing such as header compression/decompression by 6LoWPAN, and fragmentation/reassembly.

The MCU 302 transmits the measured value or event, which is detected by the temperature sensor 303 and the illuminance sensor 304, as a payload of a sensor data packet to the relay device 101 via the PAN control unit 305.

<Prefix Distribution Processing of Relay Device 101>

Figure 4:
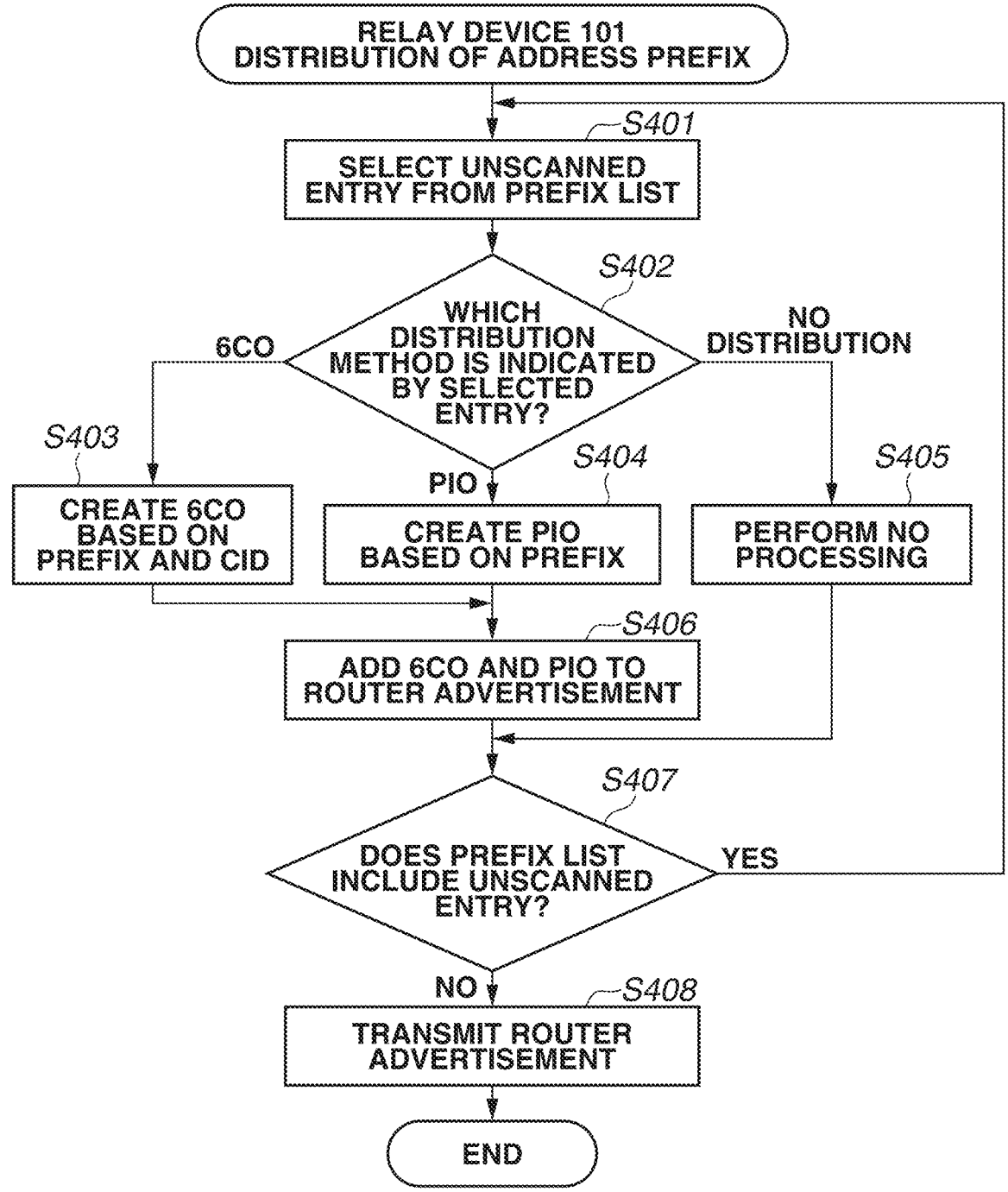
FIG. 4 is a flowchart illustrating prefix distribution processing to be performed by a relay device according to a first exemplary embodiment.

Next, prefix distribution processing to be performed by the relay device 101 according to the present exemplary embodiment will be described with reference to FIGS. 4 and 5. FIG. 4 is a flowchart illustrating processing for determining a distribution method for each prefix included in a list of IPv6 address prefixes (hereinafter referred to as a prefix list) of the relay device 101 and adding the distribution method to an RA packet to be distributed. This processing is implemented by causing the CPU 204 to load and execute a program stored in the ROM 206 when the relay device 101 distributes prefixes to the nearby 6LoWPAN router (6LR) and node (6LN). FIG. 5 illustrates the prefix list of the relay device 101. This prefix list may be held in the RAM 205 or the ROM 206 of the relay device 101. The CPU 204 references or updates prefixes stored in the RAM 205 or the ROM 206 and manages the prefixes. Each entry included in the prefix list includes information about the type of a prefix, the type of a detection result (e.g., a measured value or event detected by a sensor) associated with the prefix, and a distribution method for the prefix.

In step S401, one entry is selected from the prefix list illustrated in FIG. 5. In step S402, the distribution method item in the entry selected in step S401 is checked to determine which distribution method is used. For example, if an entry 502 or an entry 503 is selected in the prefix list in step S401, the distribution method field indicates "6CO", and thus the processing proceeds to step S403. Then, a 6LoWPAN Context Option (6CO) is created to distribute prefixes (fd00:1111::/64, fd00:2222::/64) included in the entry. In this case, a Context ID (CID) to be used for IPv6 header compression by 6LoWPAN is added to each of the prefixes. For example, if the entry 502 is selected, "1" is set to the CID field of 6CO. Similarly, if the entry 503 is selected, "2" is set to the CID field. If the entry 504 is selected in step S401, the distribution method field indicates "PIO", and thus the processing proceeds to step S404. Then, the PIO for distributing a prefix (fd00:aaaa::/64) included in the entry is created. When an option for distributing a prefix is created in step S403 or S404, the processing proceeds to step S406 and the option created as described above is added to the RA packet. On the other hand, if the entry 505 is selected in step S401, the distribution method field indicates "no distribution", and thus the processing proceeds to step S405. However, since no prefix is distributed in this case, particular processing is not carried out and the processing proceeds to step S407. In step S407, it is checked whether the prefix list illustrated in FIG. 5 includes an unscanned entry which is not selected yet. If there is an unscanned entry, the processing returns to step S401 to continue the processing. As a result, the processing of any one of steps S403 to S405 is carried out on all entries in the prefix list. After the above-described processing is carried out on all entries in the prefix list, the processing proceeds to step S408, and the RA packet is transmitted to the WSN 109, thereby distributing prefixes.

In the present exemplary embodiment, the prefix list illustrated in FIG. 5 is constructed in advance by an administrator or a user of the information processing system 100 illustrated in FIG. 1 by using a configuration file or the like. However, the distribution method may be constructed by the relay device 101 upon start-up based on a performance in a previous operation. Alternatively, a configuration in which the sensor data processing devices 106 and 107 each set flow information and provide notification of the prefix list by some method may be employed.

As for the data distribution method, the "performance in a previous operation" refers to a previous performance of a communication state. The "communication state" used herein refers to a frequency of data distribution in terms of data type, the size of data packets in terms of data type, or a communication load on a network in terms of data type. Specifically, the frequency of data distribution can be recognized based on, for example, the type of a larger amount of data among the pieces of data which have reached the relay device 101. It is generally expected that the frequency of data distribution increases as the number of sensors that distribute a predetermined type of data increases. Accordingly, the frequency of data distribution can be predicted based on the number of sensors for each data type. The size of data packets can be recognized based on, for example, the number of fragments for each data type. The communication load on a network can be recognized based on, for example, the number of nodes or the number of transfers for each data type.

According to the present embodiment, if the communication state can be predicted based on the type of each data, a prefix or a distribution method for each data can be determined by the administrator or user. In this case, the administrator or user is allowed to set a prefix or a distribution method to the relay device 101, and the relay device 101 includes means for causing the administrator or user to determine a prefix or a distribution method. On the other hand, if the performance of the communication state can be detected, as described below, the relay device 101 may determine a prefix or a distribution method for each data, or the sensor data processing devices 106 and 107 may cause the relay device 101 to set a prefix or a distribution method.

In the example illustrated in FIG. 5 described above, the result of detection of a temperature is represented by a prefix (fd00:1111::/64), the result of human detection is represented by a prefix (fd00:2222::64), the result of detection of an illuminance is represented by a prefix (fd00:aaa::/64), and 6CO, 6CO, and PIO are used as distribution methods for the temperature detection result, the human detection result, and the illuminance detection result, respectively.

In general, the compression efficiency in the distribution by the 6CO is higher than that in the distribution by the PIO. Accordingly, if a detection result that requires a greater sensor data packet length is recognized in advance, the detection result that requires a greater sensor data packet length can be preferentially distributed by the 6CO. To preferentially distribute the detection result by the 6CO, a predetermined prefix can be used for the sensor data.

With this configuration, the distribution method for each entry of the prefix list is preferably set in such a manner that the use band of the WSN 109 is narrowed or the processing load of the relay device 101 is reduced. For example, if fragmentation occurs during transfer of packets on the WSN 109, there may be concerns about an increase in the use band and an increase in the processing load of the relay device 101. In such a case, the prefix associated with the type of the detection result that requires a greater sensor data packet length can be preferentially distributed by the 6CO. In addition, the prefix associated with the type of a detection result that is frequently transferred in the WSN 109, or the prefix associated with the type of a detection result obtained through sensing by a larger number of sensors can be distributed by the 6CO.

On the other hand, the number of prefixes that can be distributed by the 6CO is limited, and thus the PIO is used to distribute prefixes that cannot be distributed by the 6CO. In other words, the PIO is used when the prefix that is associated with the type of a detection result that is expected to be processed by the sensor data processing devices 106 and 107 cannot be distributed by the 6CO. The prefix associated with the type of a detection result that is not expected to be processed by the sensor data processing devices 106 and 107 is not distributed. Thus, packets including the detection result are prevented from being transferred to the WSN 109.

The distribution method in the prefix list illustrated in FIG. 5 can be determined as follows. The distribution method for the prefix list is determined, thereby enabling the relay device 101 to select a prefix distribution method depending on the distribution method.

First, the prefix distribution method can be determined based on the number of sensors using a prefix. Specifically, when the number of sensors using a predetermined prefix is larger than a predetermined number, the prefix can be distributed by the 6CO, and when the number of sensors using the predetermined prefix is smaller than the predetermined number, the prefix can be distributed by the PIO. Accordingly, when the number of sensors using the predetermined prefix is larger than the predetermined number, the relay device 101 can select the distribution method using the 6CO for the prefix, and when the number of sensors using the predetermined prefix is smaller than the predetermined number, the relay device 101 can select the distribution method using the PIO for the prefix.

The distribution method in the prefix list can be determined based on the frequency with which the relay device 101 receives packets having an IP address set based on the predetermined prefix. For example, when the frequency with which the relay device 101 receives packets is recognized and the frequency of receiving packets having an IP address using the predetermined prefix is higher than a predetermined threshold, the 6CO can be set as the prefix distribution method, and when the frequency is lower than the threshold, the PIO can be set as the prefix distribution method.

Furthermore, the prefix distribution method can be determined based on the frequency of occurrence of fragmentation of data packets of a predetermined data type. In this case, the frequency of occurrence of fragmentation of packets received by the relay device 101 is recognized. When the frequency of occurrence of fragmentation of packets using the predetermined prefix is higher than a predetermined threshold, the 6CO can be set as the prefix distribution method, and when the frequency is lower than the threshold, the PIO can be set as the prefix distribution method. Appropriately selecting the prefix distribution method as described above enables a reduction in the use band of the WSN 109 and a reduction in the processing load of the relay device 101.

<IPv6 Address Automatic Setting Processing of Sensor 102>

Figure 6:
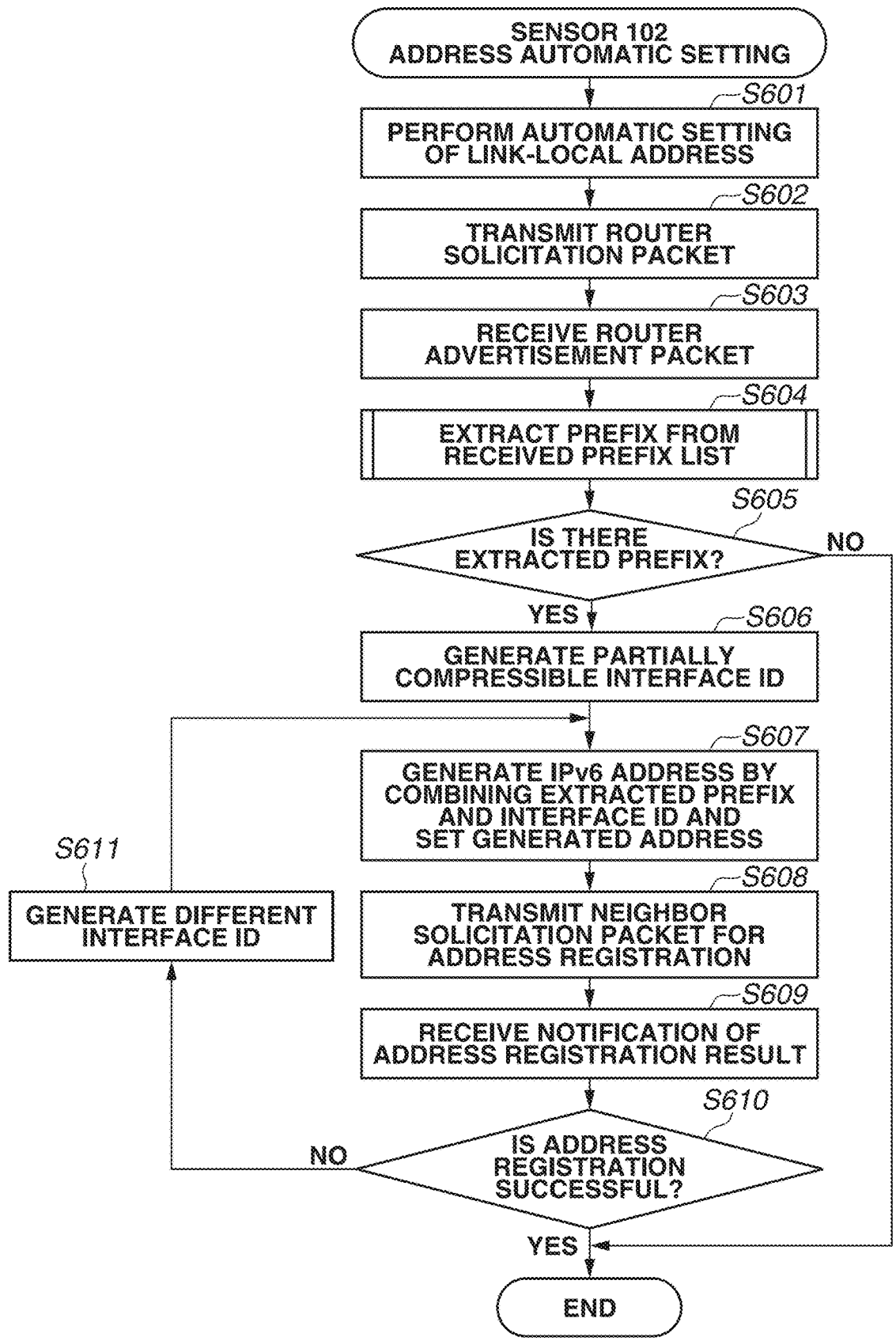
FIG. 6 is a flowchart illustrating address automatic setting processing to be performed by a sensor according to the first exemplary embodiment.
Figure 7:
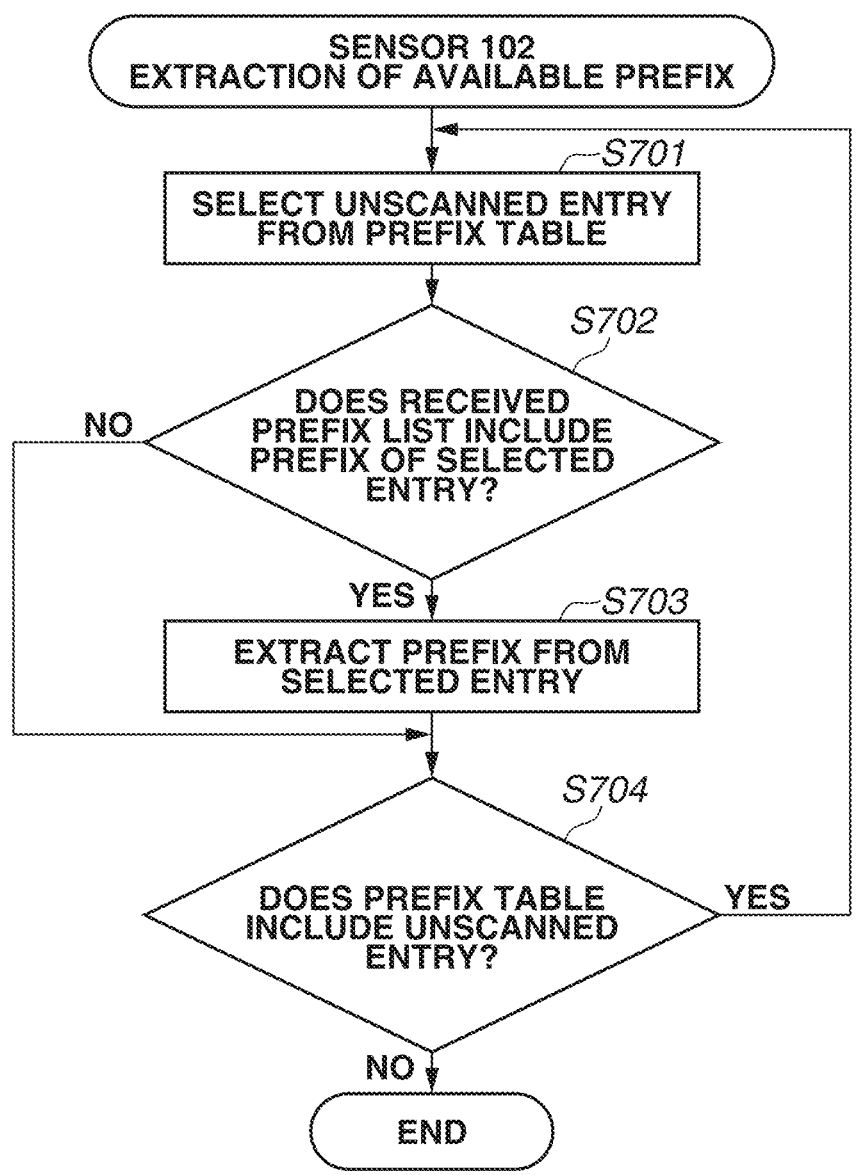
FIG. 7 is a flowchart illustrating prefix extraction processing to be performed by the sensor according to the first exemplary embodiment.

Next, IPv6 address automatic setting processing to be performed by the sensor 102 according to the present exemplary embodiment will be described with reference to FIGS. 6 to 9. FIG. 6 illustrates IPv6 address automatic setting processing to be executed by the sensor 102, and FIG. 7 illustrates prefix selection processing to be performed during the processing. The sensor 102 executes the IPv6 address automatic setting processing illustrated in the flowchart of FIG. 6 so as to transmit sensor data packets immediately after start-up.

First, in step S601, the sensor 102 sets an IPv6 link-local address. After that, in step S602, a router solicitation (RS) packet is transmitted using the set IPv6 link-local address, and then, in step S603, a router advertisement (RA) packet, which is a response to the RS packet, is received. An option for distributing the prefix created by the relay device 101 as described above may be added to the RA packet received in step S603. A plurality of prefixes included in the option within the RA packet is hereinafter referred to as a received prefix list.

In step S604, the sensor 102 determines whether the received prefix list includes an available prefix. If the received prefix list includes an available prefix, the available prefix is extracted. The prefix extraction processing is described with reference to the flowchart of FIG. 7.

In step S701 illustrated in FIG. 7, one entry is selected from the prefix table illustrated in FIG. 8. This prefix table is stored in the memory area of the MCU 302, and includes prefixes corresponding to the respective types of measured values or events detected by the sensor 102. In the present exemplary embodiment, the sensor 102 includes the temperature sensor 303 and the illuminance sensor 304. Accordingly, the prefixes respectively associated with the temperature sensor 303 and the illuminance sensor 304 are stored in entries 802 and 803, respectively. Next, in step S702, it is checked whether the received prefix list includes the prefix of the selected entry. If the received prefix list includes the prefix of the entry (YES in step S702), the processing proceeds to step S703 to extract the prefix of the selected entry as the available prefix. In step S702, if the received prefix list does not include the prefix (NO in step S702), the processing proceeds to step S704.

Then, in step S704, it is checked whether the prefix table includes an unscanned entry. If the prefix table includes an unscanned entry (YES in step S704), the processing returns to step S701 to select an unscanned entry again and repeat the prefix extraction processing. In step S704, if there is no unscanned entry (NO in step S704), the processing for extracting an available prefix is terminated.

In the present exemplary embodiment, the relay device 101 creates the 6CO and PIO based on the prefix list illustrated in FIG. 5. Accordingly, the prefix corresponding to the entry 802 in the prefix table illustrated in FIG. 8 is distributed by the 6CO, and the prefix corresponding to the entry 803 is distributed by the PIO. The prefixes are extracted as available prefixes in the processing illustrated in FIG. 7. Assume herein that the prefix table of each sensor illustrated in FIG. 8 is set in association with the prefix list of the relay device 101 illustrated in FIG. 5. Specifically, it may be necessary for the administrator or user of the information processing system 100 to appropriately set the prefix table so that the prefix list illustrated in FIG. 5 matches the correlation between prefixes and types of detection results in the prefix table illustrated in FIG. 8.

Next, referring again to the flowchart of FIG. 6, in step S605, it is checked whether there is a prefix extracted in the processing illustrated in FIG. 7. If there is an extracted prefix (YES in step S605), the processing proceeds to step S606 to perform processing for generating the IID that enables partial compression by 6LoWPAN header compression processing.

Figure 9:
FIG. 9 is a diagram illustrating an interface ID format generated by the sensor according to the first exemplary embodiment.

The IID has a format as illustrated in FIG. 9. A portion 901 surrounded by a frame border illustrated in FIG. 9 is a portion that can be omitted during header compression. A portion 902 that is underlined with a solid line (hereinafter referred to as the solid line portion 902) and a portion 903 that is underlined with a broken line (hereinafter referred to as the broken line portion 903) are portions that are not omitted during header compression and are transmitted as packet header information. In the present exemplary embodiment, an identification number representing the type of a detection result is input in the solid line portion 902. Also, in this embodiment an identification number representing the sensor 102 in the WSN 109 (e.g., an identification number used for the relay device 101 to identify the sensor of the transmission source of the packet) is input in the broken line portion 903. For example, 0x01 is input in the solid line portion 902 when the IID corresponding to the temperature sensor 303 is generated based on the information of the prefix table illustrated in FIG. 8, and 0x0a is input in the solid line portion 902 when the IID corresponding to the illuminance sensor 304 is generated. As a number for identifying the sensor 102, 0x02 is input in the broken line portion 903. In this case, an identification number for identifying the sensor 102 may be preliminarily set by the administrator or user of the information processing system 100, or may be generated by each sensor based on information, such as a media access control (MAC) address of the PAN control unit 305, which is capable of uniquely identifying a device.

Next, in step S607, an IPv6 address is created by combining the prefix extracted in step S604 with the IID generated in step S606, and the created IPv6 address is set to the network interface of the sensor. In this case, if a plurality of prefixes is extracted in step S604, a plurality of IIDs is generated in step S606 and a plurality of IPv6 addresses is set in step S607. In the case of the sensor 102, two IPv6 addresses, i.e., an address fd00:1111::ff:fe00:0102 corresponding to the temperature sensor 303 and an address fd00:aaaa::ff:fe00:0a02 corresponding to the illuminance sensor 304, are set.

When the IPv6 addresses are set in step S607, in step S608, a neighbor solicitation (NS) packet is transmitted to register the set IPv6 addresses to the 6LBR. Then, in step S609, a neighbor advertisement (NA) packet including a notification of an address registration result is received. Further, the address registration result received in step S610 is checked, and if the address registration is successful (YES in step S610), the IPv6 address automatic setting processing for the address is terminated. On the other hand, if the address registration is unsuccessful (NO in step S610), the processing proceeds to step S611 to generate an IID different from the IID with which the address registration is unsuccessful. Assume that, in the processing of regenerating the IID, the IID is generated by setting a different value to the broken line portion 903 in the IID format illustrated in FIG. 9. For example, when the registration of the address fd00:1111::ff:fe00:0102 generated by the sensor 102 as the address corresponding to the temperature sensor 303 is unsuccessful, the value of the broken line portion 903 may be incremented to generate an IID "0000:00ff:fe00:0103". Then, the processing returns to step S607, and the processing of steps S607 to S609 is performed as processing for registering the newly generated IPv6 address.

In the present exemplary embodiment, eight bits are allocated to the solid line portion 902 for identifying the type of a detection result, and eight bits are allocated to the broken line portion 903 for identifying the sensor. However, the length of each portion may be varied depending on the number of measured values or events detected by the WSN 109, or the number of sensors to inform identical detection results.

In a case where it is confirmed that the registration of the IPv6 address is unsuccessful in step S610, the present exemplary embodiment illustrates an example where the value of the broken line portion 903 is incremented in the IID format illustrated in FIG. 9. Alternatively, a configuration in which a random number is used for regenerating this portion may be used. The present exemplary embodiment uses a configuration in which, when the IPv6 address registration processing is unsuccessful, the registration of the IPv6 address is repeatedly attempted by changing the value of the broken line portion 903. However, when the registration is failed a predetermined number of times, the IPv6 address may be set using the IID generated from the MAC address (or an address obtained by expanding the MAC address into an EUI-64 format) of the PAN control unit 209. In this case, however, it should be noted that the type of the detection result cannot be identified from the IID when the relay device 101 performs transfer processing.

Further, in the present exemplary embodiment, the relay device 101 sets the IPv6 address with which the type of a detection result can be identified using both the prefix and the solid line portion 902 of the IID. Alternatively, the prefix and the solid line portion 902 may be used to identify different pieces of information, respectively. For example, the IPv6 address having a format as described below may be set. That is, the prefix is used to identify the type of a detection result, the solid line portion 902 is used to identify information other than the type of a detection result, and the format enables identification of an installation location or an installation time of each sensor, and the like. In this case, however, it is necessary for all sensors to generate the IID using a unified format so as to accurately identify information in the transfer processing to be performed by the relay device 101.

Like in the present exemplary embodiment, when a plurality of IPv6 addresses is set by each sensor, there is a need to generate an appropriate transmission source address depending on the type of a detection result included in a payload of a transmission packet. For example, when the sensor 102 generates a packet including the detection result of the temperature sensor 303, the transmission source address is fd00:1111::ff:fe00:0102. Similarly, when the sensor 102 generates a packet including the detection result of the illuminance sensor 304, the transmission source address is fd00:aaaa::ff:fe00:0a02.

<Packet Transfer Processing of Relay Device 101>

Lastly, IPv6 packet transfer processing to be performed by the relay device 101 according to the present exemplary embodiment will be described with reference to FIGS. 10 and 11.

FIG. 10 illustrates a list of flow information set to the OpenFlow switch of the transfer processing unit 212 of the relay device 101, i.e., a part of the flow table. In the present exemplary embodiment, the type of a detection result included in a packet can be identified from the transmission source IPv6 address of the packet. Accordingly, flow information including a matching rule for checking features of the detection result and information for identifying the transmission source sensor from the prefix and IID of the transmission source IPv6 address of the packet is set.

A setting example of flow information according to the present exemplary embodiment will be described below with reference to FIG. 10. In the information processing system 100 according to the present exemplary embodiment, the sensor data processing device 106 analyzes the detection result of the temperature sensor 303, independently of the transmission source sensor, and the sensor data processing device 107 analyzes the detection result of the illuminance sensor 304. In this case, the relay device 101 registers the following two pieces of flow information in the flow table illustrated in FIG. 10 so as to transfer the detection result of the temperature sensor 303 to the sensor data processing device 106 for the OpenFlow switch. First flow information (1002) has a matching rule for determining whether the IID has a format "0000:00ff:fe00:01XX (XX represents any 8-bit data)", and second flow information (1004) has a matching rule for determining whether the IPv6 prefix has a format "fd00:1111/64". On packets that conform to these matching rules, an action of "overwriting the destination with the address of the sensor data processing device 106 and transferring packets to the LAN/WAN 108" is executed. Similarly, two pieces of flow information are provided for transferring packets including the detection result of the illuminance sensor 304 to the sensor data processing device 107. First flow information (1003) has a matching rule for determining whether the IID has a format "0000:00ff:fe00:0aXX (XX represents any 8-bit data)", and second flow information (1005) has a matching rule for determining whether the prefix has a format "fd00:aaaa/64". On packets that conform to these matching rules, an action of "overwriting the destination with the address of the sensor data processing device 107 and transferring packets to the LAN/WAN 108" is executed. Similarly, when a transfer instruction is sent from the sensor data processing devices 106 and 107 to the relay device 101 so as to analyze the detection result of another sensor, flow information based on the instruction information is registered.

The present exemplary embodiment illustrates an example where two pieces of flow information are registered in the flow table. Like in the present exemplary embodiment, in a case where a sensor detection type included in a packet can be identified by both the prefix and the IID, a configuration in which one of the prefix and the IID is registered may be used. For example, when all sensors can add an address by using the method of generating the IID of the format illustrated in FIG. 9, the need for flow information having a matching rule for comparing prefixes is eliminated, and thus only the flow information having a matching rule for comparing IIDs is registered in the flow table.

Transfer processing using the OpenFlow switch having the setting as described above will be described with reference to the flowchart of FIG. 11. In step S1101, upon receiving a 6LoWPAN packet, the PAN control unit 209 executes header decompression and fragmentation processing on the received packet to convert the packet into an IPv6 packet, and then inputs the packet to the transfer processing unit 212. After that, in step S1102, it is checked whether the flow table includes flow information having a matching rule that matches the received packet input to the transfer processing unit 212.

In this case, if the flow table includes flow information matching the received packet (YES in step S1102), the processing proceeds to step S1103 to execute an action included in the flow information and execute packet transfer processing. On the other hand, in step S1102, if the flow table does not include the flow information (NO in step S1102), the processing proceeds to step S1104 to receive the received packet by an application on the relay device 101, perform payload analysis processing, and also perform processing for identifying the transfer destination.

In the present exemplary embodiment, when the processing proceeds to step S1104, a configuration in which the received packet is processed by an application on the relay device 101 is used. However, the packet may be discarded. Further, a configuration in which a Packet-In message is transmitted to the OpenFlow controller function of the sensor data processing devices 106 and 107 to inquire about a processing method for the received packet and the processing method for the received packet is determined may be used.

In the present exemplary embodiment, only the solid line portion 902 in the IID format illustrated in FIG. 9 is referenced so as to determine the transfer destination based on the type of the detection result. Alternatively, a configuration in which the transfer destination is determined by referring to only the broken line portion 903 for identifying the transmission source sensor, or by referring to both the solid line portion 902 and the broken line portion 903 may be used. The present exemplary embodiment assumes a case where the transfer destination is changed based on the type of the detection result of each sensor. Alternatively, a configuration in which the transfer destination is classified using not only the information about the type of the detection result, but also location information, such as the installation location of the transmission source sensor or information about the operation state of the transmission source sensor, such as a node or a router, may be used.

<Advantageous Effects of First Exemplary Embodiment>

The use of the first exemplary embodiment described above makes it possible to appropriately select 6CO or PIO, or select not to distribute a predetermined prefix, when the relay device 101 on the network distributes the prefix by router advertisement (RA).

Thus, according to the present exemplary embodiment, it is possible to efficiently perform header compression depending on the type of sensor data. For example, it is possible to use the prefix distributed by the 6CO for transfer of the detection result that requires a larger number of packets to be transferred, or the detection result with a higher frequency of occurrence of fragmentation during transmission of packets. This configuration can narrow the use band of the WSN 109 or prevent, for example, an increase in the packet length, an increase in the throughput of the relay device 101, or a frequent occurrence of fragmentation.

On the other hand, the IID cannot be generally compressed without using a specific format defined in the 6LoWPAN standards. Conventionally, a technique for analyzing the content of a payload using the entire 64-bit IID so as to enhance the efficiency of IoT-GW packet transfer processing has been proposed. However, in the case of analyzing the content of a payload using the entire 64-bit IID, the IID cannot be compressed, which causes an increase in packet length and an increase in the throughput of the relay device 101. On the other hand, according to the present exemplary embodiment, a portion in which the IID can be compressed is compressed, and data type and identification information about each sensor are stored in a portion that cannot be compressed. With this configuration, it is possible to maximize the IID compression processing and determine an appropriate transfer destination by using at least one of the data type and the identification information about each sensor, thereby efficiently performing the transfer processing.

A second exemplary embodiment will be described below with reference to the drawings. The configuration of a system according to the present exemplary embodiment, the hardware configuration of the relay device 101, and the hardware configuration of the sensor 102 are similar to those of the first exemplary embodiment described above with reference to FIGS. 1 to 3, and thus descriptions thereof are omitted.

In the present exemplary embodiment, when the relay device 101 attempts to redistribute a prefix after distributing the prefix once, processing for dynamically determining the prefix distribution method is performed in consideration of, for example, the reception state of packets including the detection result received from the WSN 109 until that time. Further, an example where a prefix associated with a default context (i.e., a context with a CID "0") is generated and distributed by the 6CO will be described by way of example assuming a case where many types of sensor data are received from the sensors 102 to 105 in the WSN 109. In addition, IPv6 address automatic setting processing to be performed by each sensor when the default context is distributed, and packet transfer processing of a packet using the default context to be carried out by the relay device 101 will also be described below.

<Prefix Redistribution Processing of Relay Device 101>

Prefix redistribution processing to be performed by the relay device 101 according to the present exemplary embodiment will be described with reference to FIGS. 12 and 13. The following description is made assuming that the prefix distribution method described in the first exemplary embodiment is executed before the processing described in the present exemplary embodiment is carried out.

Figure 12:
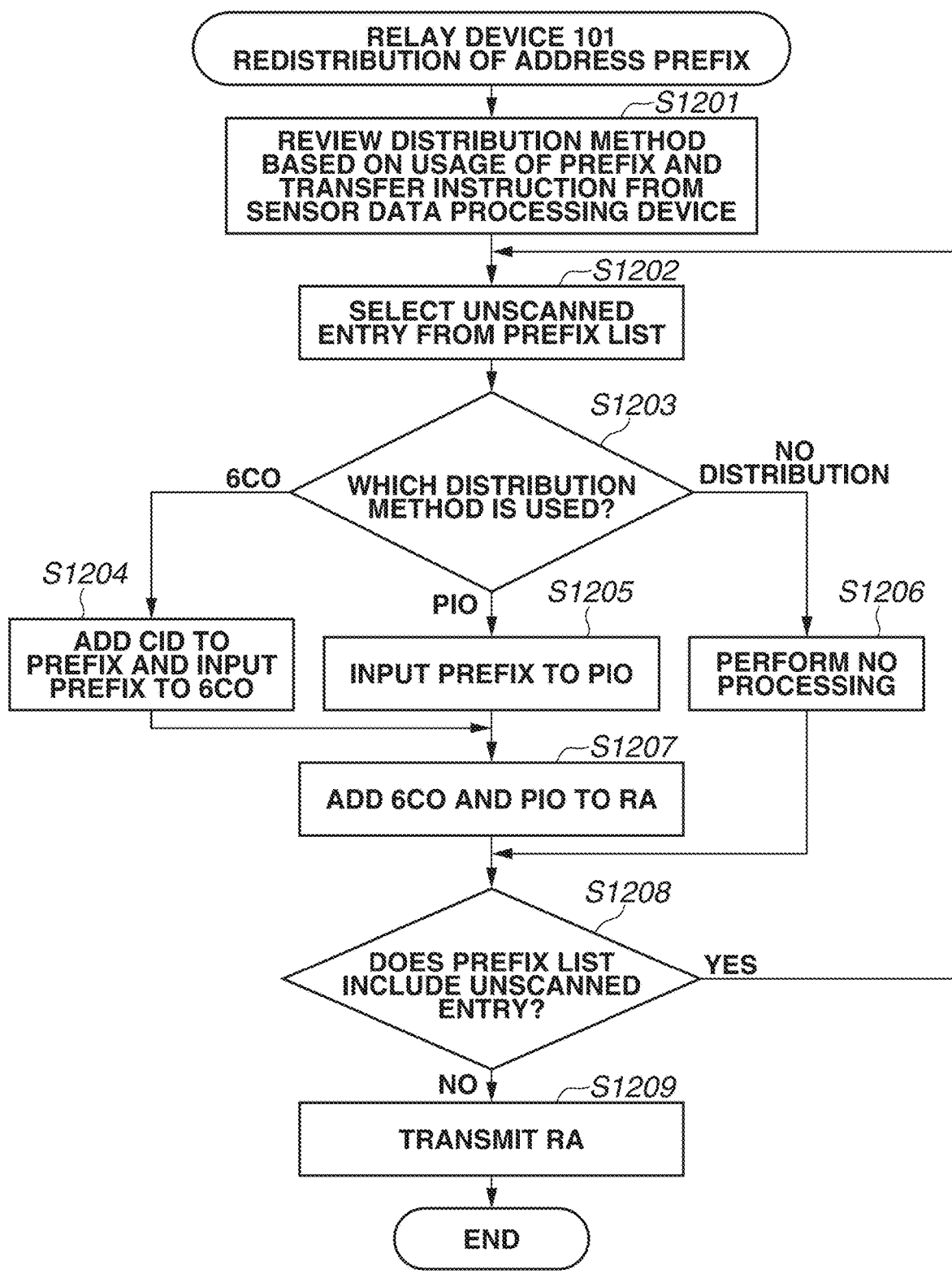
FIG. 12 is a flowchart illustrating prefix redistribution processing to be performed by a relay device according to a second exemplary embodiment.

FIG. 12 is a flowchart illustrating processing to be carried out when the relay device 101 redistributes each prefix included in a list of prefixes (hereinafter referred to as a prefix list). FIG. 13 illustrates the prefix list of the relay device 101 that is used for redistribution of each prefix. The prefix list according to the present exemplary embodiment includes information about the usage of each prefix and the reception state of sensor data packets using each prefix in the relay device 101, in addition to the information about the prefix list described in the first exemplary embodiment. These pieces of information are indicated in the columns of "the number of nodes", "the number of packet transfers", and "number of fragments", respectively, in FIG. 13.

In the first exemplary embodiment, as illustrated in FIG. 5, each prefix is distributed using the 6CO for transmitting the detection results of the temperature sensor 303 and a human detection sensor, and using the PIO for transmitting the detection result of the illuminance sensor 304. No prefix is distributed to a vibration sensor. Assume that, after the prefix distribution, the relay device 101 transfers the detection result of each sensor in the WSN 109 and receives a new transfer instruction indicating the detection result of the vibration sensor or the like from the sensor data processing devices 106 and 107. In view of the state as described above, redistribution of the address prefix of the relay device 101 illustrated in FIG. 12 is carried out.

In step S1201, the prefix redistribution method is reviewed based on information about the usage of prefixes of the prefix list illustrated in FIG. 13 and transfer instructions from the sensor data processing devices 106 and 107. First, since the transfer instructions are received from the sensor data processing devices 106 and 107, as indicated by an entry 1305 illustrated in FIG. 13, the prefix list is updated so that the prefix used for transmitting the detection result of the vibration sensor is distributed by the PIO. In the present exemplary embodiment, prefixes are distributed by the PIO for the detection results corresponding to the transfer instructions newly received from the sensor data processing devices 106 and 107. However, when the number of prefixes to be distributed in a context is less than 15, the prefixes may be distributed by the 6CO.

Next, the usage of each prefix is checked. In the present exemplary embodiment, it is obvious that fragmentation is occurring at a high frequency in an entry 1304 corresponding to the illuminance sensor 304 to which the prefix is originally distributed by the PIO. Fragmentation of packets is disadvantageous in that, for example, the processing load of the relay device 101 is increased and the band of the WSN 109 is compressed. Accordingly, the distribution method is changed to one that enables distribution of prefixes which can be compressed by the 6CO so as to attempt to reduce the number of fragments. In this case, when the number of prefixes already distributed by the 6CO is less than 15, the CID may be added to each prefix to be distributed. The distribution method may be changed when the use frequency of a prefix distributed by the 6CO is lower than that of a prefix distributed by the PIO and when a more efficient communication and reduction in the use band is expected by exchanging the distribution methods.

On the other hand, when 15 prefixes are being distributed by the 6CO and it is difficult to replace the distribution methods of 6CO and PIO for the prefixes being distributed, a default context with the CID "0" is distributed. The present exemplary embodiment illustrates an example where the default context is distributed. In the case of using the default context, an entry for the default context as indicated by 1306 in FIG. 13 is newly added. In this case, prefixes different from each prefix for identifying the type of the detection result of each sensor are used. In the present exemplary embodiment, fd00:1234:5678::/64 is used as a prefix for the default context. Then, the distribution of a prefix for the type of the detection result of the sensor for which the default context is to be used is stopped. In the present exemplary embodiment, in order to stop the distribution of a prefix for identifying the detection result of the illuminance sensor 304 with a larger number of fragments, the distribution method in the entry 1304 illustrated in FIG. 13 is changed to "no distribution". Through the processing described above, the prefix for the default context is selected in the IPv6 address automatic setting processing to be performed by each sensor in the WSN 109 as processing to be performed when "no prefix is distributed and a default context is distributed".

After the execution of the processing described above, processing of steps S1202 to S1209 is carried out to actually distribute prefixes. The processing of steps S1202 to S1209 is similar to the above-described processing of steps S401 to S408 illustrated in FIG. 4 according to the first exemplary embodiment, and thus descriptions thereof are omitted. The distribution method for each prefix to be distributed in the default context is checked in S1203, like in the distribution method for the other prefixes, and then the processing proceeds to step S1204 to input a prefix to the 6CO and add the prefix to the RA together with the other prefixes to be transmitted.

The exemplary embodiment described above illustrates an example where the prefix distribution method is changed to redistribute each prefix depending on the frequency of occurrence of fragmentation. However, the prefix distribution method may be changed to redistribute each prefix depending on the number of nodes (e.g., the number of sensors), the number of packet transfers, the frequency of reception in the relay device 101, or the like. Specifically, as described in the first exemplary embodiment, in a case where the number of sensors is larger than a predetermined number, when the frequency of reception in the relay device 101 is higher than a predetermined threshold and when the frequency of occurrence of fragmentation is higher than a predetermined threshold, the prefix distribution method can be changed to the 6CO, or the prefix distribution method can be changed to redistribute each prefix in the default context. The redistribution of each prefix may be carried out not only during periodical transmission of RA packets as defined in the standards, but also may be sequentially carried out by being event driven, for example, upon reception of a new transfer instruction from the sensor data processing devices 106 and 107, like in the present exemplary embodiment. In this case, however, there is a concern about an increase in the load of the prefix management in the WSN 109 when events frequently occur. Therefore, a format in which the distribution processing is carried out every predetermined period by the administrator or user of the information processing system 100 may be used.

<IPv6 Address Automatic Setting Processing of Sensor 102>

Figure 14:
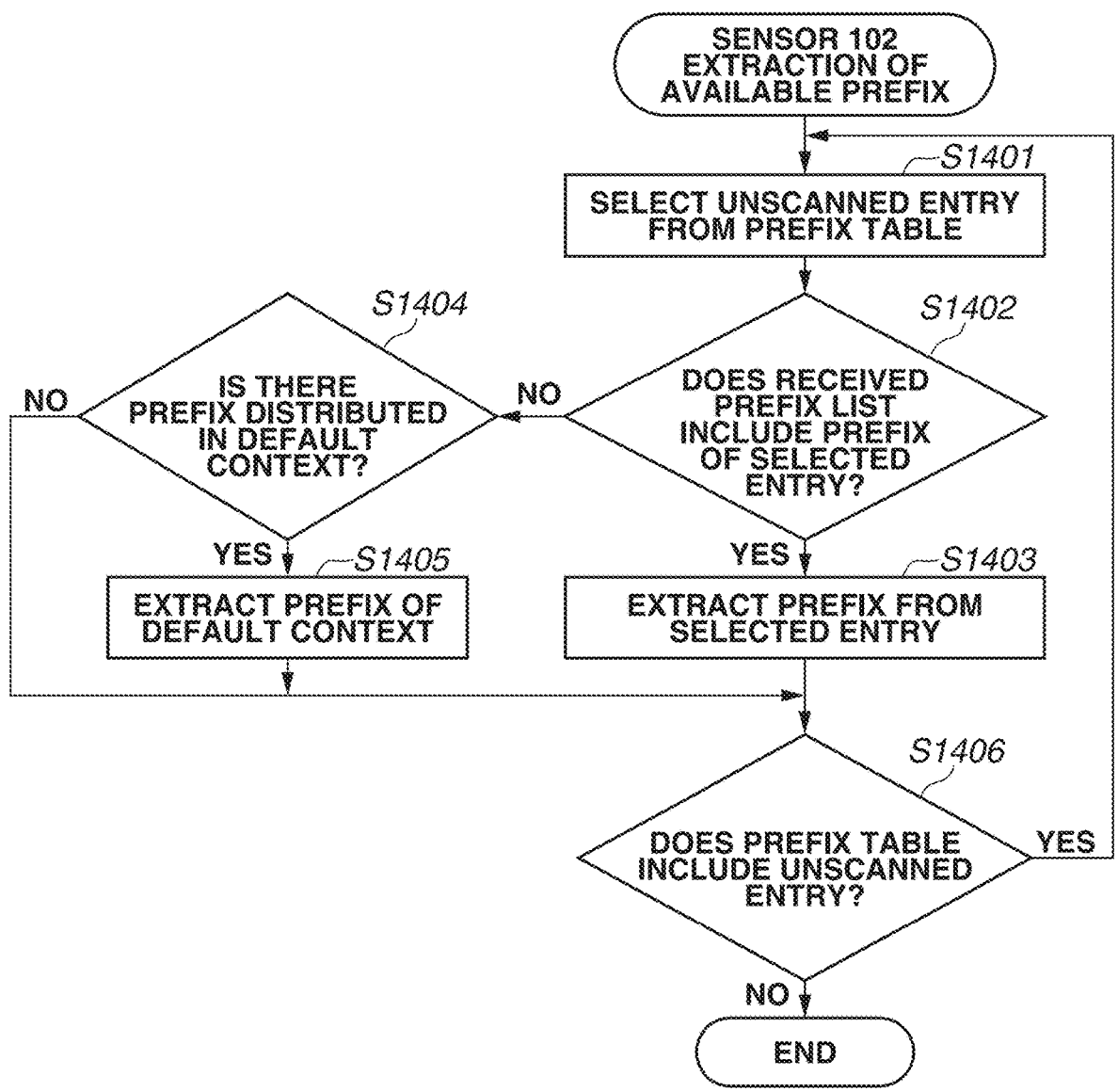
FIG. 14 is a flowchart illustrating prefix extraction processing to be performed by a sensor according to the second exemplary embodiment.

Next, IPv6 address automatic setting processing to be performed by the sensor according to the present exemplary embodiment will be described. The IPv6 address automatic setting processing to be performed by the sensor according to the present exemplary embodiment differs from the processing according to the first exemplary embodiment in terms of the available prefix extraction processing illustrated in FIG. 7. Accordingly, the description of processing illustrated in FIG. 6 that is similar to the processing of the first exemplary embodiment is omitted, and the available prefix extraction method to be carried out in the present exemplary embodiment will now be described with reference to the flowchart of FIG. 14. Also, in the present exemplary embodiment, like in the first exemplary embodiment, assume that the sensor 102 includes the prefix table illustrated in the FIG. 8.

In step S1401, like in step S701 illustrated in FIG. 7, an unscanned entry is selected from the prefix table of the sensor 102. Next, in step S1402, it is checked whether the received prefix list includes the prefix of the selected entry. In step S1402, if there is the matched prefix (YES in step S1402), the processing proceeds to step S1403 to extract the prefix of the entry, like in step S703 illustrated in FIG. 7 according to the first exemplary embodiment. On the other hand, if the prefix list does not include the prefix of the selected entry (NO in step S1402), the processing proceeds to step S1404. In step S1404, it is checked whether the received prefix list includes a default context. If the received prefix list includes the default context (YES in step S1404), the processing proceeds to step S1405 to perform processing for selecting the default entry instead of the prefix of the entry in the prefix table. In step S1404, if the received prefix list does not include the default context (NO in step S1404), the processing proceeds to step S1406 without performing any processing. In step S1406, processing similar to that of step S704 illustrated in FIG. 7 is carried out.

In the present exemplary embodiment, the prefix for identifying the detection result of the illuminance sensor 304, i.e., the prefix included in the entry 803 illustrated in FIG. 8, is not distributed to the sensor 102. However, as described above regarding the prefix redistribution processing of the relay device 101, the default context having the prefix fd00:1234:5678::/64 is distributed. Accordingly, an address is generated using the default context, instead of the prefix for identifying the detection result of the illuminance sensor 304. In this case, when an IPv6 address is generated in steps S605 to S607 in the flowchart illustrated in FIG. 6, an address fd00:1234:5678::ff:fe00:0a02 is obtained.

The present exemplary embodiment described above illustrates an example where a default context is used to identify the detection result of the illuminance sensor 304. Alternatively, a configuration in which a default context is used for various types of detection results may be used. For example, a configuration in which a default context is used not only for information about the illuminance sensor 304, but also for information about an acceleration sensor may be used. In this case, the relay device 101 does not perform the prefix distribution processing on the acceleration sensor, as well as on the illuminance sensor 304. Further, after confirming that the prefix associated with the acceleration sensor is not distributed to the sensor which transmits the detection result of the acceleration sensor, the sensor performs the IPv6 address setting processing using the default context. However, in the case of using the default context for transmission of a plurality of detection results, it is preferable that the type of each detection result and identification information about each sensor is identifiable using the IID format illustrated in FIG. 9. This is because, when there is a plurality of sensors that transmit the detection result using the default context, it is impossible to identify the type of each detection result using the prefix and to designate the transfer destination. The details thereof will be described below regarding the packet transfer processing in the relay device 101.

<Packet Transfer Processing of Relay Device 101>

Next, IPv6 packet transfer processing to be performed by the relay device 101 according to the present exemplary embodiment will be described. As the packet transfer processing according to the present exemplary embodiment, processing similar to that of the first exemplary embodiment is carried out. However, it is necessary to construct a flow table in consideration of the transfer destination of packets to be transmitted using the default context, like the detection result about the illuminance sensor 304 of the sensor 102. Accordingly, differences between the first exemplary embodiment and the second exemplary embodiment will be described with reference to the flow table of FIG. 15 that is used in the present exemplary embodiment. Processing to be executed using the flow table will be described with reference to FIG. 16.

In the flow table illustrated in FIG. 15, entries 1502 and 1503 in which matching rules for checking the IID are configured are not changed from the information 1002 or 1003 illustrated in FIG. 10. On the other hand, in the entries in which matching rules for checking each prefix are configured, some of the entries are added or deleted in consideration of packets to be transmitted using the default context in the present exemplary embodiment. Specifically, the flow information 1005, which is registered in FIG. 10 as a flow entry for transferring the detection result of the illuminance sensor 304, is deleted in FIG. 15. Further, an entry 1505 is added so that packets using the default context are processed by an application that runs on the relay device 101 and the transfer destination is analyzed. The entry 1505 has a matching rule for determining whether the prefix is the prefix distributed in the default context (i.e., fd00:1234: 5678/64). The destination of the packet corresponding to the rule is overwritten with the relay device 101, and an action of transferring packets to a local port is executed. The entry 1505 is an entry required when the transfer destination cannot be determined appropriately using only a prefix in a case where detection results of various types of sensors are transmitted using the default context. In this case, if the transfer destination can be identified from the IID, the processing for analyzing the transfer destination of packets using an application is not required, and thus the priority of the flow entry for the entry 1503 is set to be higher than that for the entry 1505.

Figure 16:
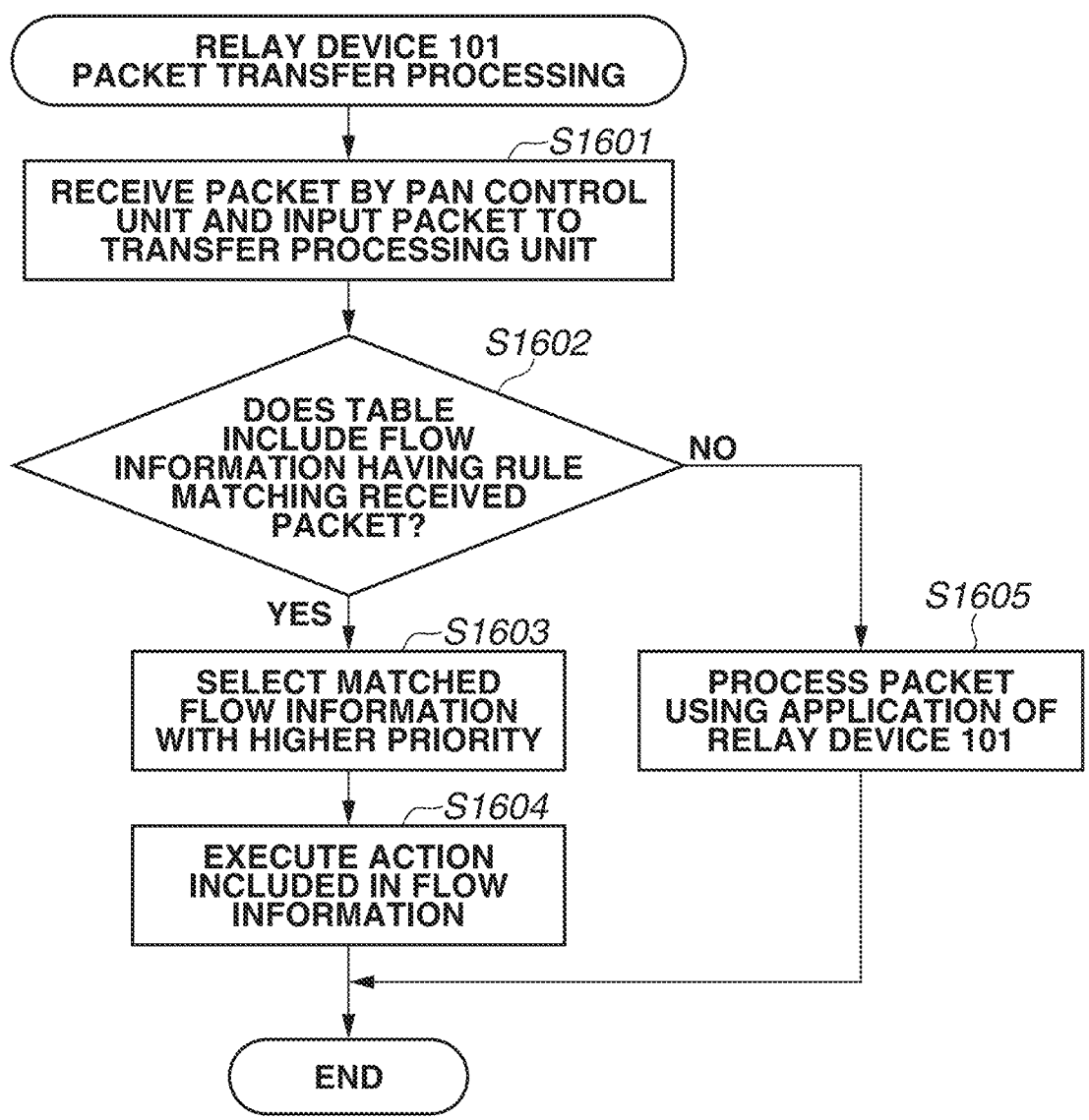
FIG. 16 is a flowchart illustrating packet transfer processing to be performed by the relay device according to the second exemplary embodiment.

Next, packet transfer processing according to the present exemplary embodiment will be described with reference to FIG. 16. Processing of steps S1601 to S1602 is similar to the processing of steps S1101 to S1102 illustrated in FIG. 11, and thus descriptions thereof are omitted. In step S1602, if there is flow information having a rule that matches the received packet (YES in step S1602), the processing proceeds to step S1603 to perform processing for selecting flow information with a higher priority among the pieces of matched flow information. Then, an action included in the flow information selected in step S1604 is executed. For example, in the present exemplary embodiment, when the sensor 102 transmits the detection result regarding the illuminance sensor 304 by using the transmission source address fd00:1234:5678::ff:fe00:0a02, the packets correspond to the matching rules of the two pieces of flow information of entries 1503 and 1505. In this case, when the priority item is checked, the priority of the flow information of entry 1503 is set to be higher than the priority of the flow information 1505. Accordingly, the flow information of entry 1503 is selected in step S1603. Further, in step S1604, processing is executed in accordance with the action list of the flow information of entry 1503.

If the packet received in step S1602 does not correspond to any one of the matching rules (NO in step S1602), the processing proceeds to step S1605 to process the packet by using an application on the relay device 101. In the present exemplary embodiment, the flow entry 1505 is used to clearly specify that the application on the relay device 101 is caused to perform packet transfer processing using the default context. However, processing similar to that described above is carried out also when there is no flow information having a rule that matches the packet received in step S1605, and thus the entry 1505 is not essential in this case. On the other hand, if the processing carried out in step S1605 is packet discarding processing or Packet-In message transmission processing on the OpenFlow controller function of each of the sensor data processing devices 106 and 107, the entry 1505 is registered, like in the present exemplary embodiment, thereby making it possible to implement the transfer processing using an application.

<Advantageous Effects of Second Exemplary Embodiment>

The use of the second exemplary embodiment described above enables change of the prefix distribution method in consideration of the usage of the prefix associated with the type of each detection result, the state of a packet fragment, or the like when the information processing system 100 is actually operated. Further, the use of a default context enables an increase in the number of types of detection results on which 6LoWPAN header compression can be performed and also enables efficient transfer of detection results.

A third exemplary embodiment will be described below with reference to the drawings. The configuration of a system according to the present exemplary embodiment and the hardware configuration of the relay device 101 are the same as those of the first exemplary embodiment described above with reference to FIGS. 1 to 3, and thus descriptions thereof are omitted. As the prefix distribution method to be performed by the relay device 101, the processing described in the first exemplary embodiment or the second exemplary embodiment is carried out, and thus descriptions thereof are omitted.

In the first and second exemplary embodiments, all sensors compare a prefix table with a distributed prefix list and select an appropriate prefix, and then generate the IID of the format illustrated in FIG. 9 and sets the IPv6 address. However, since the IPv6 address automatic setting processing is processing in which the address setting processing defined in IPv6 and 6LoWPAN standards (RFC4862, RFC6775, etc.) is expanded, in a case where some of the sensors belonging to the WSN 109 do not support the processing, there is a possibility that the processing may not be executed. Therefore, the present exemplary embodiment assumes a state where the sensors 102 to 105 belonging to the WSN 109 include a node that does not support the IPv6 address automatic setting processing described in the first and second exemplary embodiments. In addition, processing to be carried out when the relay device 101 transfers sensor data packets received from the WSN 109 at the time will be described.

The IPv6 address setting state of each sensor participating in the WSN 109 in the present exemplary embodiment will now be described prior to description of transfer processing of the relay device 101.

Assume in the present exemplary embodiment that only the sensor manufactured by a specific vendor (hereinafter referred to as a vendor A) can perform the IPv6 address automatic setting processing described in the first exemplary embodiment. For example, assume that the sensor 102 is manufactured by the vendor A and the sensor 102 is capable of performing the IPv6 address automatic setting processing described in the first exemplary embodiment. In this case, the sensor 102 performs the processing described in the first exemplary embodiment, sets two IPv6 addresses (e.g., the address fd00:1111::ff:fe00:0102 corresponding to the temperature sensor 303 and the address fd00:aaaa::ff:fe00:0a02 corresponding to the illuminance sensor 304). Similarly, assume that some of the sensors in the WSN 109 that are manufactured by the vendor A can perform the IPv6 address setting processing described in the first exemplary embodiment and the type of detection results of the sensors can be identified from the IPv6 address.

On the other hand, a sensor manufactured by a vendor other than the vendor A cannot execute the IPv6 address automatic setting processing according to the first exemplary embodiment. Accordingly, the IPv6 address automatic setting processing is performed for the sensor based on the IPv6 and 6LoWPAN standards, regardless of the type of the sensing module of the device. For example, if the sensor 105 is manufactured by a vendor other than the vendor A, the sensor 105 attempts to perform the IPv6 address setting processing using both the prefixes fd00:1111::/64 and fd00:aaaa::/64, regardless of the type of the sensing module of the device. Assume that the IID generated from the MAC address of the device (or an address obtained by expanding the MAC address into an EUI-64 format) is used in this case.

<Packet Transfer Processing of Relay Device 101>

The IPv6 packet transfer processing to be performed by the relay device 101 according to the present exemplary embodiment will be described. As described above, the present exemplary embodiment assumes a state where the IPv6 address automatic setting for some of the sensors in the WSN 109 that are manufactured by the vendor A is made based on the method described in the first exemplary embodiment, and the IPv6 address automatic setting for the other sensors is made based on the standards. Accordingly, the flow table used in the present exemplary embodiment is expanded from the flow table used in the first exemplary embodiment, as illustrated in FIG. 17. On the other hand, the packet transfer processing according to the present exemplary embodiment is similar to that in the flowchart illustrated in FIG. 11 of the first exemplary embodiment, and thus descriptions thereof are omitted.

The relay device 101 according to the present exemplary embodiment can identify the type of the detection result or the transfer destination from the prefix or IID of the transmission source address, as long as the sensor of the transmission source of the sensor data packet supports the IPv6 address automatic setting described in the first exemplary embodiment. Therefore, in the present exemplary embodiment, it is first checked whether the IID of the transmission source address of the packet corresponds to the format illustrated in FIG. 9. If the format illustrated in FIG. 9 is used, it can be estimated that the sensor of the transmission source of the packet has executed the IPv6 address automatic setting processing by the method described in the first exemplary embodiment. Accordingly, flow information having a matching rule for checking the IID of the transmission source address, such as flow information 1702 and flow information 1703 illustrated in FIG. 17, is registered. These pieces of flow information are not changed from the flow information 1002 or 1003 illustrated in FIG. 10.

On the other hand, when the sensor having the configuration as described above, such as the sensor 105, is present in the WSN 109, there is a need to correct the flow entry having a matching rule for checking the prefix of the transmission source address. This is because the sensor 105 performs the IPv6 address automatic setting processing regardless of the sensing module of the device, so that an unintended combination of the prefix of the transmission source address of the received packet and the type of the detection result of the packet may be generated. Accordingly, in the present exemplary embodiment, the matching rule is changed, like in entries 1704 and 1705 illustrated in FIG. 17. In these entries, the prefix of the transmission source address is checked as a matching rule, and the vendor ID of the transmission source MAC address is also checked at the same time. In the checking processing, if it can be determined that the vendor ID indicates the vendor A, it can be determined that the sensor of the transmission source supports the IPv6 address automatic setting described in the first exemplary embodiment. Therefore, the transfer processing based on the action list is executed only when matching rules of both the vendor ID and the prefix of the transmission source address are satisfied.

Figure 11:
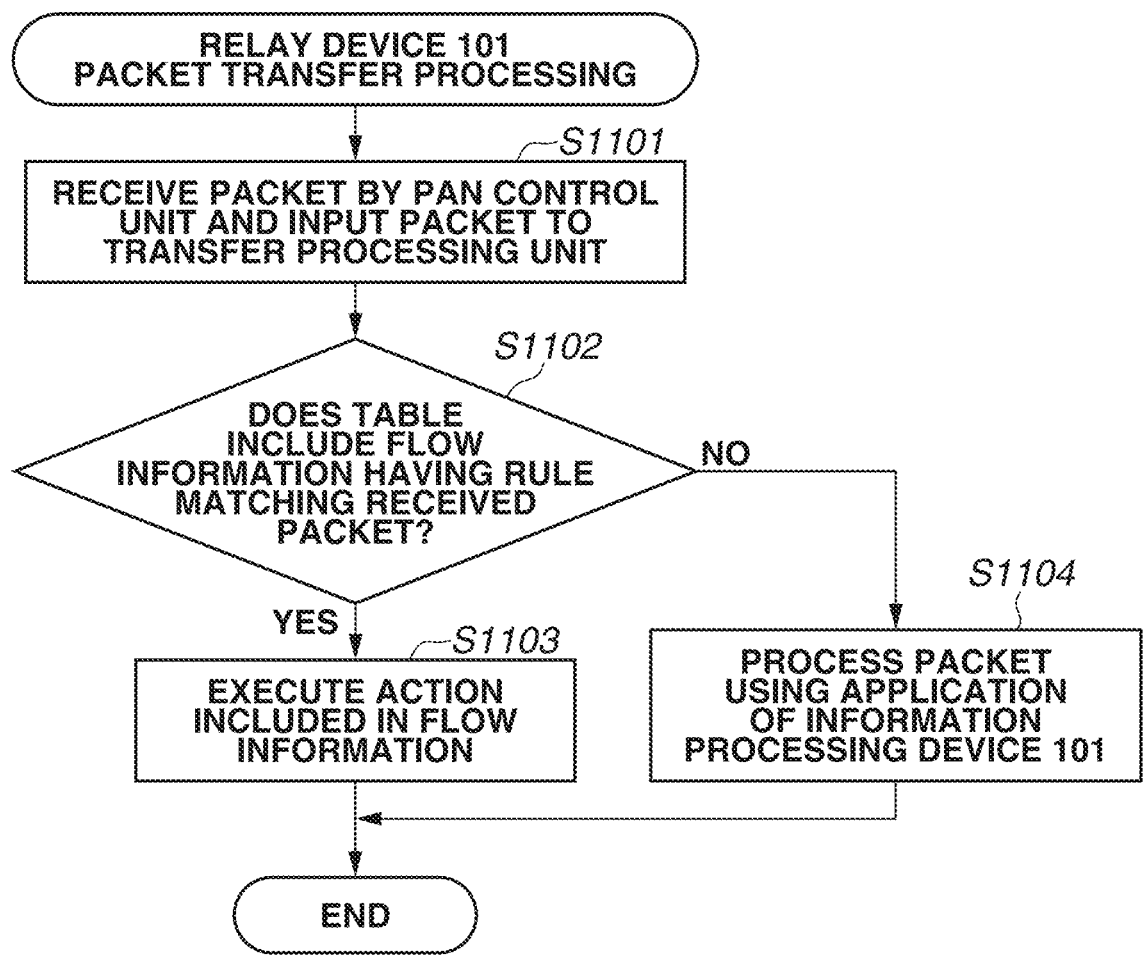
FIG. 11 is a flowchart illustrating packet transfer processing to be performed by the relay device according to the first exemplary embodiment.

As described above, when a flow table is constructed and the flowchart of FIG. 11 is executed, the processing proceeds to step S1103 only for the packets from the sensors that are manufactured by the vendor A and support the IPv6 address automatic setting described in the first exemplary embodiment, and the packets can be transferred using the OpenFlow switch. On the other hand, the processing proceeds to step S1104 for packets from sensors manufactured by a vendor other than the vendor A, and the packet transfer processing is executed by an application on the relay device 101.

<Advantageous Effects of Third Exemplary Embodiment>

The use of the third exemplary embodiment described above enables determination as to whether the transfer destination can be identified from the transmission source IPv6 address of a packet by referring to the vendor ID, even when some of the sensors belonging to the WSN 109 do not support the IPv6 address automatic setting processing described in the first exemplary embodiment, and thus enables efficient execution of the transfer processing.

Some embodiments can also be implemented by a combination of the first to third exemplary embodiments described above. For example, the address prefix redistribution processing of the relay device 101 and the IPv6 address automatic setting processing of the sensor 102 as described in the second exemplary embodiment may be used with the third exemplary embodiment.

According to some embodiments, it is possible to distribute a prefix to be used for setting an IPv6 address in accordance with a method according to a communication state, or a method according to a user instruction.

Other Embodiments

Some embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described some exemplary embodiments, it is to be understood that the claims are not limited to the disclosed exemplary embodiments. The scope of the following claims is to be accorded the broadest interpretation so as to encompass all such modifications and equivalent structures and functions.

This application claims the benefit of Japanese Patent Application No. 2017-152759, filed Aug. 7, 2017, which is hereby incorporated by reference herein in its entirety.

What is claimed is:

1. A first communication device comprising:
one or more processors; and
one or more memories storing a prefix using an Internet Protocol version 6 (IPv6) over Low power Wireless Personal Area Networks (6LoWPAN) Context Option (6CO) in an Internet Protocol (IP) address conforming to IPv6 and including instructions that, when executed by the one or more processors, cause the first communication device to:
perform determination whether a ratio of packets to which fragmentation has occurred among packets received from a second communication device to which a prefix using a Prefix Information Option (PIO) is distributed is higher than a predetermined threshold; and
perform control whether or not to send a router advertisement to which the 6CO is added to the second communication device so that the second communication device is able to send a packet by a prefix using the 6CO, based on result of the determination,
wherein the first communication device performs the control to send the router advertisement to which the 6CO is added in a case where it is determined that the ratio of the packets to which fragmentation has occurred among the packets received from the second communication device is higher than the predetermined threshold, and the first communication device performs the control not to send the router advertisement to which the 6CO is added in a case where it is not determined that the ratio of the packets to which fragmentation has occurred among the packets received from the second communication device is higher than the predetermined threshold, and
wherein in a case where a number of prefixes using the 6CO exceeds a limit value of use when the router advertisement to which the 6CO is added is to be sent to the second communication device, the first communication device performs the control to send a router advertisement to which the PIO is added to another second communication device to which a prefix using the 6CO has been distributed and to send the router advertisement to which the 6CO is added to the second communication device.

2. The first communication device according to claim 1, wherein the first communication device transfers a packet received from a first network including the second communication device to a second network different from the first network.

3. The first communication device according to claim 2, wherein the first network is a network conforming to 6LoWPAN and the second network is a network conforming to Ethernet® or Institute of Electrical and Electronic Engineers (IEEE) 802.11 series standard.

4. The first communication device according to claim 2, wherein the first communication device transfers the packet to a transfer destination depending on the prefix of the packet received from the first network.

5. The first communication device according to claim 2, wherein, in a case where a predetermined vendor ID is included in the packet received from the first network, the first communication device transfers the packet to a transfer destination depending on the prefix of the packet.

6. The first communication device according to claim 2, wherein the first communication device changes a header portion of the packet received from the first network into a format conforming to the second network.

7. The first communication device according to claim 6, wherein the change includes adding an IPv6address corresponding to a type of data included in the packet received from the first network.

8. The first communication device according to claim 1, wherein the first communication device sends the Router Advertisement to the second communication device in a case where the second communication device automatically sets an IP address conforming to IPv6.

9. The first communication device according to claim 1, wherein the first communication device sends the Router Advertisement to the second communication device in response to a request from the second communication device.

10. A control method for a first communication device, the method comprising:
determining whether a ratio of packets to which fragmentation has occurred among packets received from a second communication device to which a prefix using a Prefix Information Option (PIO) is distributed is higher than a predetermined threshold; and
controlling whether or not to send a router advertisement to which a Low power Wireless Personal Area Networks (6LoWPAN) Context Option (6CO) is added to the second communication device so that the second communication device is able to send a packet by a prefix using the 6CO, based on a result of the determining,
wherein the controlling sends the router advertisement to which the 6CO is added in a case where the determining determines that the ratio of the packets to which fragmentation has occurred among the packets received from the second communication device is higher than the predetermined threshold,
wherein the controlling does not send the router advertisement to which the 6CO is added in a case where the determining does not determine that the ratio of the packets to which fragmentation has occurred among the packets received from the second communication device is higher than the predetermined threshold, and wherein, in a case where a number of prefixes using the 6CO exceeds a limit value of use when the router advertisement to which the 6CO is added is to be sent to the second communication device, the controlling sends a router advertisement to which the PIO is added to another second communication device to which a prefix using the 6CO has been distributed and sends the router advertisement to which the 6CO is added to the second communication device.

11. A non-transitory computer-readable storage medium storing instructions which, when executed by one or more computers, cause the one or more computers to perform a process for controlling a first communication device, the process comprising:

determining whether a ratio of packets to which fragmentation has occurred among packets received from a second communication device to which a prefix using a Prefix Information Option (PIO) is distributed is higher than a predetermined threshold; and controlling whether or not to send a router advertisement to which a Low power Wireless Personal Area Networks (6LoWPAN) Context Option (6CO) is added to the second communication device so that the second communication device is able to send a packet by a prefix using the 6CO, based on a result of the determining, wherein the controlling sends the router advertisement to which the 6CO is added in a case where the determining determines that the ratio of the packets to which fragmentation has occurred among the packets received from the second communication device is higher than the predetermined threshold, wherein the controlling does not send the router advertisement to which the 6CO is added sent in a case where the determining does not determine that the ratio of the packets to which fragmentation has occurred among the packets received from the second communication device is higher than the predetermined threshold, and wherein, in a case where a number of prefixes using the 6CO exceeds a limit value of use when the router advertisement to which the 6CO is added is to be sent to the second communication device, the controlling sends a router advertisement to which the PIO is added to another second communication device to which a prefix using the 6CO has been distributed and sends the router advertisement to which the 6CO is added to the second communication device.

* * * * *